(12) United States Patent
Parab et al.

(10) Patent No.: US 11,972,266 B2
(45) Date of Patent: Apr. 30, 2024

(54) HIBERNATING AND RESUMING NODES OF A COMPUTING CLUSTER

(71) Applicant: Nutanix, Inc., San Jose, CA (US)

(72) Inventors: Nitin Parab, Palo Alto, CA (US); Dheeraj Pandey, San Jose, CA (US)

(73) Assignee: Nutanix, Inc., San Jose, CA (US)

(*) Notice: Subject to any disclaimer, the term of this patent is extended or adjusted under 35 U.S.C. 154(b) by 0 days.

(21) Appl. No.: 17/086,393

(22) Filed: Oct. 31, 2020

(65) Prior Publication Data
US 2022/0107814 A1   Apr. 7, 2022

Related U.S. Application Data

(60) Provisional application No. 63/198,201, filed on Oct. 2, 2020.

(51) Int. Cl.
*G06F 9/4401* (2018.01)
*G06F 3/06* (2006.01)
*G06F 9/455* (2018.01)

(52) U.S. Cl.
CPC .......... *G06F 9/4418* (2013.01); *G06F 3/0613* (2013.01); *G06F 3/0623* (2013.01); *G06F 3/0649* (2013.01); *G06F 3/0653* (2013.01); *G06F 3/0659* (2013.01); *G06F 3/067* (2013.01);
(Continued)

(58) Field of Classification Search
CPC .... G06F 9/4418; G06F 3/0613; G06F 3/0623; G06F 3/0649; G06F 3/0653; G06F 3/0659; G06F 3/067; G06F 9/45558; G06F 2009/45575; G06F 2009/45595; G06F 2009/4557; G06F 2009/45583; G06F 2009/45579; G06F 9/45533; G06F 9/5077;
(Continued)

(56) References Cited

U.S. PATENT DOCUMENTS

| | | |
|---|---|---|
| 6,654,830 B1 | 11/2003 | Taylor et al. |
| 6,802,062 B1 | 10/2004 | Oyamada et al. |
| 6,807,630 B2 | 10/2004 | Lay et al. |

(Continued)

OTHER PUBLICATIONS

"Hibernate your On-Demand or Reserved Liux instance," Amazon Elastic Compute Cloud, dated May 23, 2021.
(Continued)

*Primary Examiner* — Faisal M Zaman
(74) *Attorney, Agent, or Firm* — Vista IP Law Group, LLP

(57) ABSTRACT

Methods, systems and computer program products for hibernating a computing cluster. An information lifecycle manager facility (ILM) is invoked to carry out movement of data from the hypervisor of a node of a computing cluster to a different storage location. Multiple nodes of the computing cluster can be hibernated until the entire computing cluster has been hibernated. The ILM observes a replication factor of the computing cluster to suppress saving multiple copies of data. A hibernation object comprising state information of a node is stored in a network-accessible storage location. The hibernation object is accessed in response to an instruction to initiate restoration of all or parts of the computing cluster. The hibernation object can be stored using first cloud computing storage infrastructure and later, can be restored to a different cloud computing infrastructure. Upon restoration, the hibernated cluster has the same state as of the time of hibernation.

27 Claims, 17 Drawing Sheets

(52) U.S. Cl.
CPC ............... *G06F 9/45558* (2013.01); *G06F 2009/45575* (2013.01); *G06F 2009/45595* (2013.01)

(58) Field of Classification Search
CPC ............ G06F 11/1446; G06F 2201/84; G06F 3/0647; G06F 9/461; G06F 9/4856
USPC ................................ 718/1, 104, 100; 711/6
See application file for complete search history.

(56) References Cited

U.S. PATENT DOCUMENTS

| | | | |
|---|---|---|---|
| 6,813,708 | B2 | 11/2004 | Smith et al. |
| 6,882,795 | B1 | 4/2005 | Mcmurdie et al. |
| 7,693,877 | B1* | 4/2010 | Zasman .............. H04L 67/1097 707/707 |
| 8,166,477 | B1 | 4/2012 | Tormasov et al. |
| 8,230,204 | B2 | 7/2012 | Rostampour |
| 8,549,518 | B1 | 10/2013 | Aron et al. |
| 8,601,473 | B1 | 12/2013 | Aron et al. |
| 8,607,009 | B2 | 12/2013 | Nicholas et al. |
| 8,850,130 | B1 | 9/2014 | Aron et al. |
| 8,959,323 | B2 | 2/2015 | Ganti et al. |
| 9,430,268 | B2 | 8/2016 | Hussain et al. |
| 9,552,215 | B2 | 1/2017 | Voccio et al. |
| 9,652,265 | B1* | 5/2017 | Narayanasamy ....... G06F 13/10 |
| 9,772,866 | B1 | 9/2017 | Aron et al. |
| 9,804,876 | B2 | 10/2017 | Tsirkin et al. |
| 9,940,148 | B1 | 4/2018 | Dannowski |
| 10,108,517 | B1* | 10/2018 | Efremov ............... G06F 16/122 |
| 10,114,565 | B2 | 10/2018 | Nithrakashyap et al. |
| 10,860,363 | B1* | 12/2020 | Gabrielson ......... G06F 9/45558 |
| 10,901,768 | B1 | 1/2021 | Mandadi et al. |
| 11,169,835 | B1* | 11/2021 | Duong ................ G06F 9/4856 |
| 2003/0208675 | A1* | 11/2003 | Burokas ............... G06F 9/4416 713/1 |
| 2004/0083355 | A1 | 4/2004 | Smith et al. |
| 2005/0060590 | A1 | 3/2005 | Bradley et al. |
| 2005/0091354 | A1* | 4/2005 | Lowell ............... G06F 11/3051 709/224 |
| 2005/0160423 | A1 | 7/2005 | Bantz et al. |
| 2007/0185934 | A1* | 8/2007 | Cannon ............... G06F 11/1469 714/E11.122 |
| 2010/0037096 | A1 | 2/2010 | Bum et al. |
| 2012/0195187 | A1* | 8/2012 | Ashihara .................. G06F 9/46 370/235 |
| 2012/0254865 | A1 | 10/2012 | Saeki et al. |
| 2013/0080814 | A1* | 3/2013 | Cong .................... G06F 9/5094 713/340 |
| 2013/0138995 | A1 | 5/2013 | Sivaramakrishnan et al. |
| 2013/0139154 | A1 | 5/2013 | Shah et al. |
| 2013/0191354 | A1* | 7/2013 | Wilf ..................... G06F 16/185 707/694 |
| 2013/0227553 | A1* | 8/2013 | Tsirkin ................ G06F 9/45558 718/1 |
| 2013/0227554 | A1* | 8/2013 | Tsirkin ................ G06F 9/45558 718/1 |
| 2013/0227555 | A1* | 8/2013 | Tsirkin ................ G06F 9/45558 718/1 |
| 2013/0275975 | A1 | 10/2013 | Masuda et al. |
| 2015/0058521 | A1 | 2/2015 | Armstrong et al. |
| 2015/0058522 | A1* | 2/2015 | Armstrong .......... G06F 12/1009 711/6 |
| 2015/0227192 | A1 | 8/2015 | Kruglick |
| 2016/0277308 | A1* | 9/2016 | Challa .................... G06F 9/4401 |
| 2016/0283281 | A1* | 9/2016 | Antony ............... G06F 9/45558 |
| 2016/0306649 | A1 | 10/2016 | Gunti et al. |
| 2016/0323098 | A1 | 11/2016 | Bathen |
| 2016/0344821 | A1 | 11/2016 | Khosrowpour et al. |
| 2017/0039082 | A1 | 2/2017 | Ganesan et al. |
| 2017/0147409 | A1 | 5/2017 | Chandrakar et al. |
| 2018/0173513 | A1* | 6/2018 | Agarwal ............... G06F 16/182 |
| 2018/0232038 | A1* | 8/2018 | Surdu ................... G06F 1/3234 |
| 2018/0314706 | A1* | 11/2018 | Sirton ................. H04L 67/1097 |
| 2019/0317796 | A1* | 10/2019 | Kunt ..................... G06F 3/0664 |
| 2020/0034250 | A1 | 1/2020 | Chandrasekaran et al. |
| 2020/0089409 | A1* | 3/2020 | Ankireddypalle .. G06F 11/1453 |
| 2020/0133706 | A1 | 4/2020 | Koehler et al. |
| 2020/0133718 | A1 | 4/2020 | Koehler et al. |
| 2020/0192690 | A1* | 6/2020 | Gupta .................... G06F 9/5077 |
| 2020/0310848 | A1* | 10/2020 | Kaul ...................... G06F 1/3234 |
| 2020/0319694 | A1* | 10/2020 | Mohanty ............... G06F 3/0604 |
| 2021/0064408 | A1* | 3/2021 | Gill ........................ G06F 9/485 |
| 2021/0067466 | A1 | 3/2021 | Parab et al. |
| 2021/0067484 | A1 | 3/2021 | Parab et al. |
| 2021/0157620 | A1 | 5/2021 | Schütz |
| 2021/0263762 | A1* | 8/2021 | Kachare .............. G06F 12/0868 |

OTHER PUBLICATIONS

Non-Final Office Action for U.S. Appl. No. 16/778,909 dated Mar. 18, 2022.

"4.2 Hibernating a VM," FusionCompute.

Extended European Search Report for EP Patent Appln. No. 20193502.0 dated Jan. 27, 2021.

Lee, B., "Types of Hyper-V Cluster Virtual Machine Migration," Vembu, dated Aug. 17, 2018.

"Oracle VM Windows Paravirtual (PV) Drivers 2.0: New Features," An Oracle Technical White Paper, dated Jun. 2010.

Gill, B., et al., "Technical Preview: Nutanix on AWS: Making Lift and Shift Invisible," .NEXTConference, Nutanix Inc., Copyright 2019.

Devarapalli, S., et al., "Xi Clusters: Accelerate Your Hybrid Cloud Journey with Nutanix in Public Clouds," .NEXTConference, Nutanix Inc., copyright 2019.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

(56) References Cited

OTHER PUBLICATIONS

Poitras, Steven. "The Nutanix Bible" (Jan. 30, 2021), from https://nutanixbible.com/ (Publication date based on indicated capture date by Archive.org; first publication date unknown).

Cano, I et al., "Curator: Self-Managing Storage for Enterprise Clusters", *14th USENIX Symposium on Networked Systems Design and Implementation, NSDI '17*, (Mar. 27, 2017).

Notice of Allowance for U.S. Appl. No. 16/778,909 dated Aug. 12, 2022.

Notice of Allowance for U.S. Appl. No. 16/778,909 dated Sep. 21, 2022.

Poitras, Steven. "The Nutanix Bible" (Sep. 9, 2022), from https://nutanixbible.com/ (Publication date based on indicated capture date by Archive.org; first publication date unknown).

"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.

Min Choi et al., "Cluster computing environment supporting single system Image", Sep. 20, 2004, Cluster Computing, 2004 IEEE International Conference, San Diego CA USA.

Non-Final Office Action dated Jun. 9, 2023 for U.S. Appl. No. 18/161,091.

Notice of Allowance for U.S. Appl. No. 18/161,091 dated Oct. 12, 2023.

Notice of Allowance for U.S. Appl. No. 18/161,091, filed Jan. 31, 2024.

\* cited by examiner

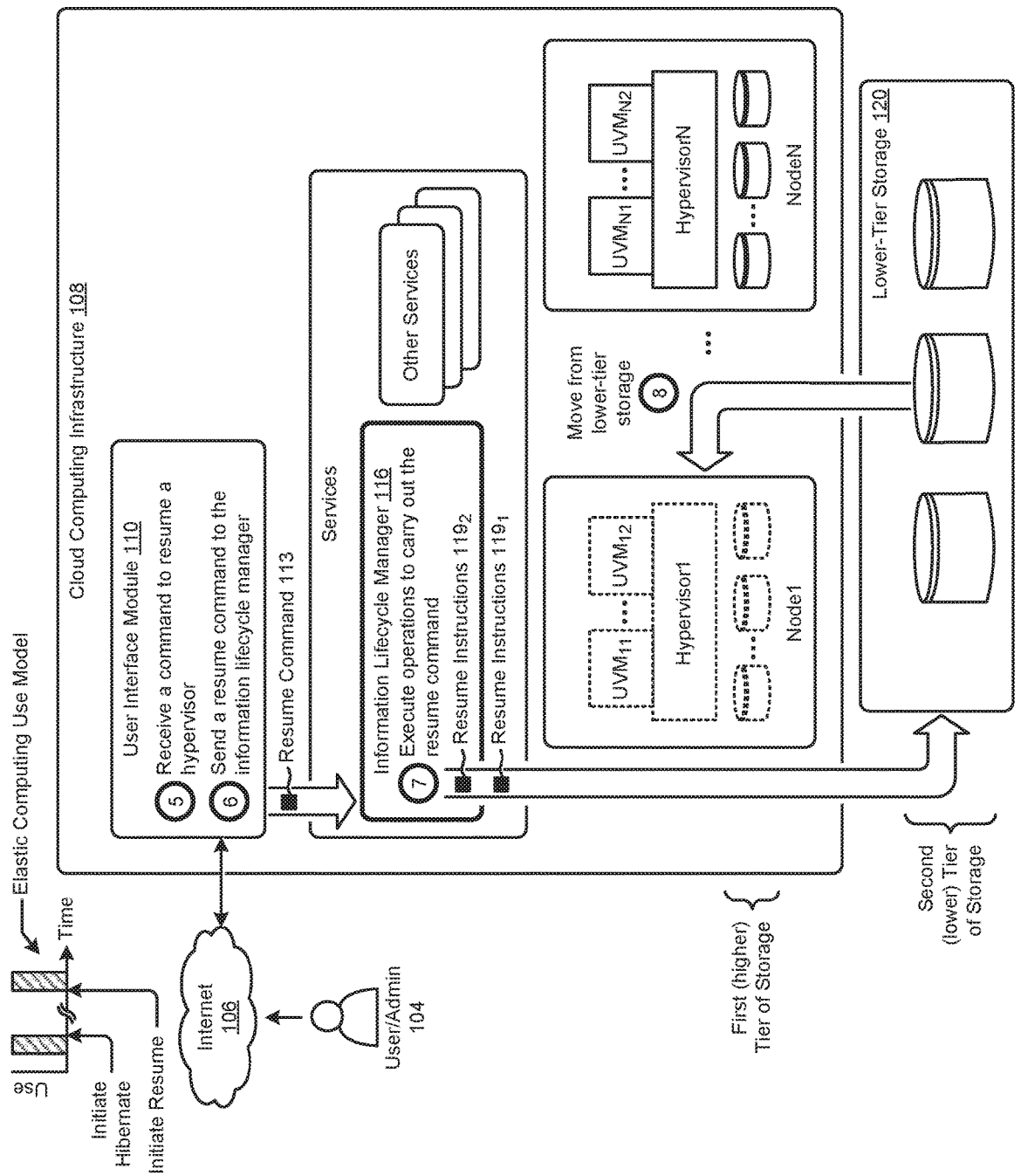
FIG. 1B1

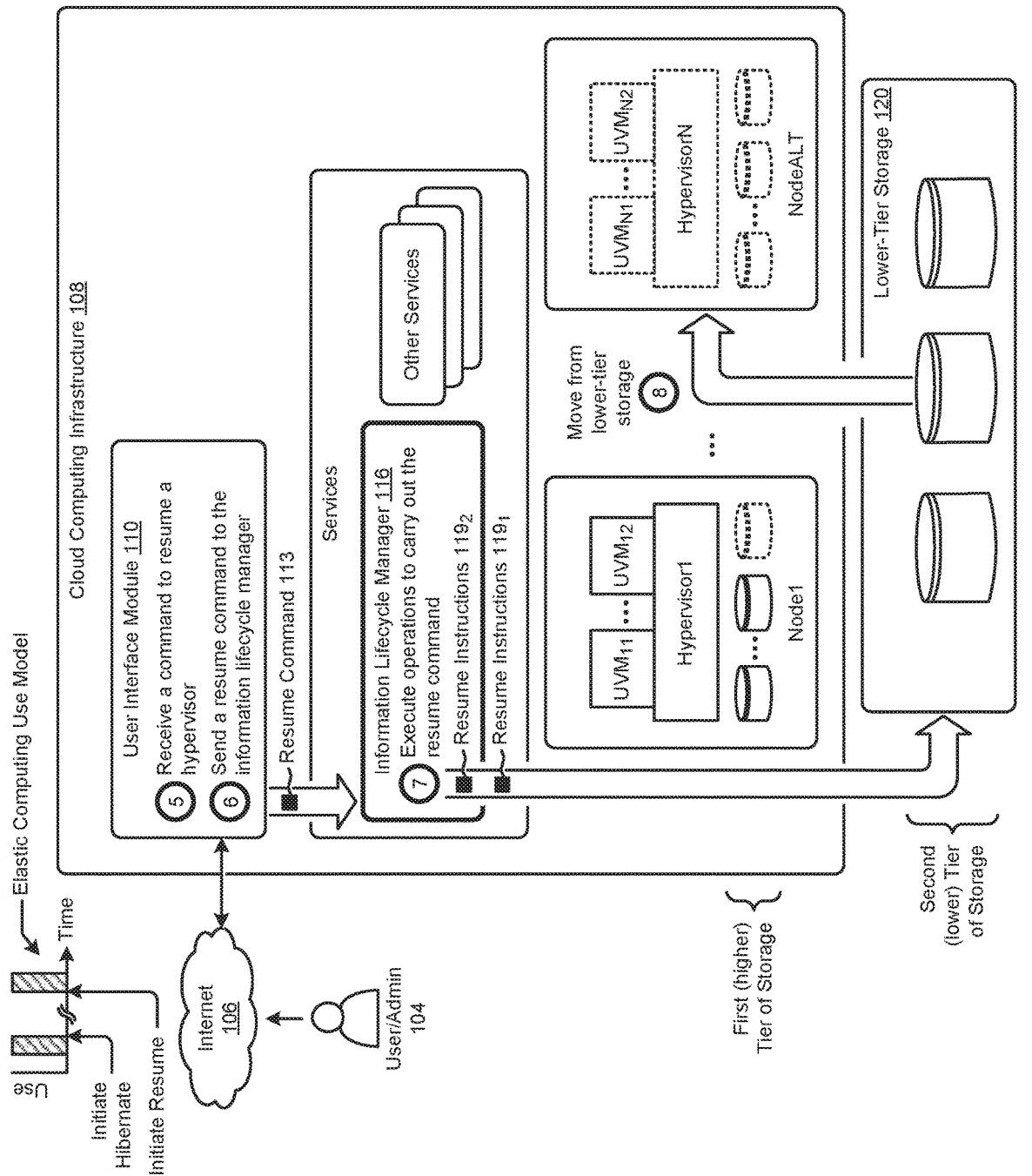
FIG. 1B2

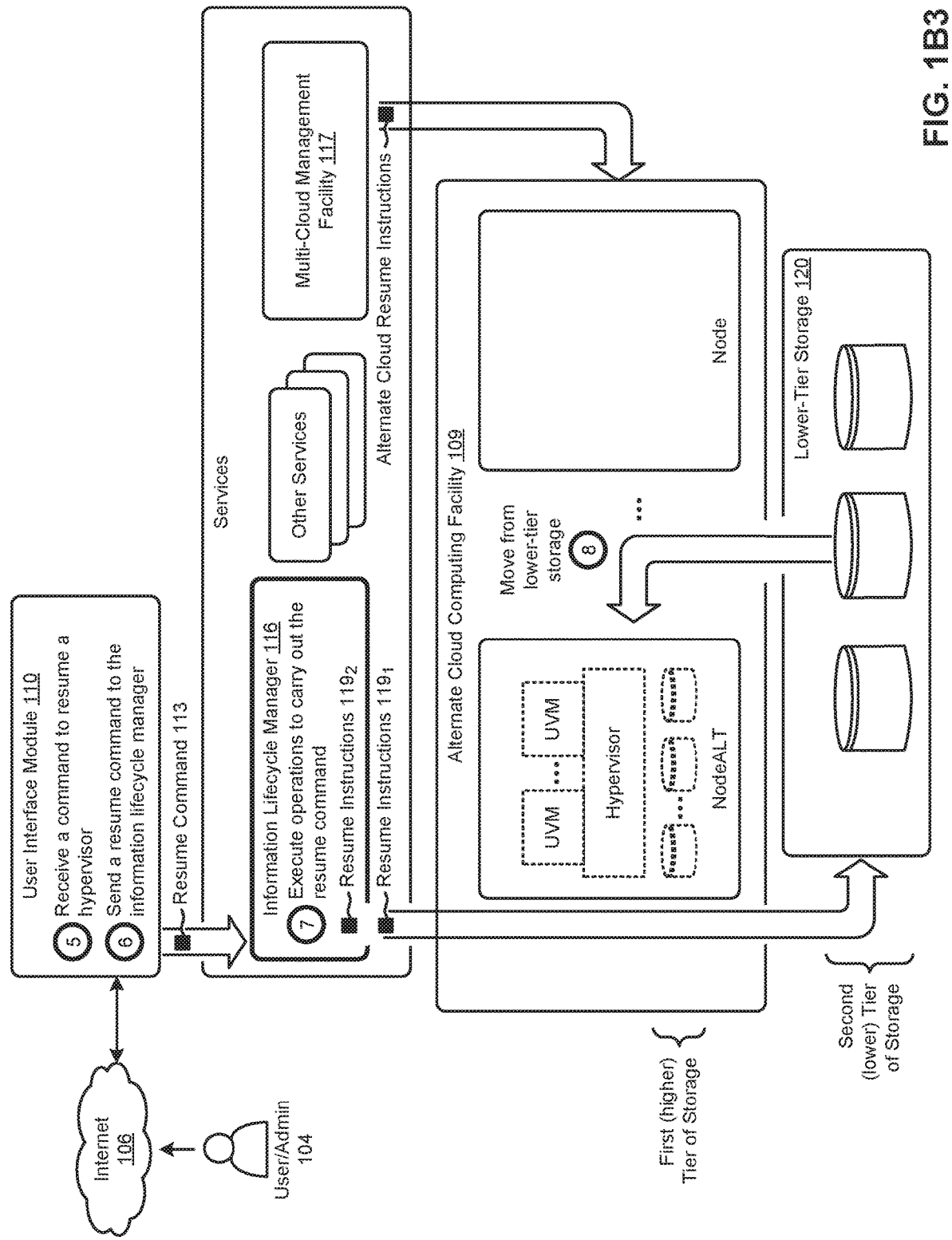
FIG. 1B3

HIBERNATING AND RESUMING NODES OF A COMPUTING CLUSTER

RELATED APPLICATIONS

The present application claims the benefit of priority to U.S. Provisional Patent Application Ser. No. 63/198,201 titled "HIBERNATING AND RESUMING NODES OF A COMPUTING CLUSTER", filed on Oct. 2, 2020 which is hereby incorporated by reference in its entirety.

TECHNICAL FIELD

This disclosure relates to cloud computing, and more particularly to techniques for hibernating and resuming nodes of a computing cluster.

BACKGROUND

Computing clusters based on virtualization systems involving hypervisors and hypervisor storage and virtualized networking that are used to run virtual machines (VMs) consume actual physical resources such as physical computing hardware and networking hardware. In cloud computing scenarios where such infrastructure is provided, at cost, to customers by public cloud vendors, customers do not want to pay for resources that are not being used. Nevertheless customers are reluctant to destroy their virtualization systems for concern of loss of data, or due to concerns or uncertainty as to whether the virtualization system would need to be restored manually to its previous configuration. One way to ameliorate such concerns is to hibernate the entire cluster. In such hibernation, the entire cluster, plus all of its data state (e.g., vDisks), plus all of its virtualization state (e.g., state of its hypervisor), plus all of its configuration state (e.g., configuration flags, etc.) are stored in a manner that facilitates easy restoration of the entire cluster and all of its states and VMs after a period of hibernation.

In some situations a cluster might be dormant for a long period of time, during which long period of time, the costs for use of resources are still being charged. In many cases, such as when there is a large amount of vDisk data, the resource usage costs are non-negligible and, as such, the costs for use of the storage resources mount up quickly—even though the storage resources are not being used by their corresponding VMs.

One approach would involve automatic detection of which data is "hot" or "cold", and to "tier-down" (i.e., to a lower cost storage tier) the cold data while retaining the "hot" data in a higher tier. An addition to this approach would be to automatically detect when the VM has gone into disuse and then to hibernate the VM in a manner that observes the distinction between "hot" data and "cold" data such that, at some future moment when it comes time to resume the VM, the VM can be resumed with its "hot" data in the higher tier and its "cold" data in the lower tier. Still further additions to this approach would be to automatically determine which portions of which data are "hot" or "cold" and move the appropriate portions of the data to the tiered storage accordingly. However it not always straightforward to which portions of which data are "hot" or "cold". Moreover, this situation is sometimes further complicated by the fact that in modern "high-availability" computing clusters, data might be replicated many times, and it would be unnecessary, and in many cases extremely wasteful, to replicate already replicated data—even if the data is being down-leveled to a lower tier of storage.

Unfortunately, determination how hibernation of such data should be carried out, is extremely complicated. Moreover, the mechanics of moving data from one tier to another tier is itself extremely complicated. Therefore, what is needed is a technique or techniques that help to move data in a hibernate/resume scenario.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for hibernating and resuming nodes of a computing cluster, which techniques advance the relevant technologies to address technological issues with legacy approaches. More specifically, the present disclosure describes techniques used in systems, methods, and in computer program products for hibernating and resuming a computing cluster using facilities of an information lifecycle manager (ILM). Certain embodiments are directed to technological solutions for using built-in capabilities of an information lifecycle manager to handle the movement of data to and from a cloud-tier storage facility.

The disclosed embodiments modify and improve over legacy approaches. In particular, the herein-disclosed techniques provide technical solutions that address the technical problems of how to move large the amount of data reliably and efficiently, and by handling any failures from a compute cluster storage tier to a cloud storage tier with proper indications such as progress of data movement and other customer visibility features.

The ordered combination of steps of the embodiments serve in the context of practical applications that perform steps for using built-in capabilities of an information lifecycle manager (ILM) to handle the movement of data to and from a cloud-tier storage facility efficiently. As such, techniques for using built-in capabilities of an ILM to handle the movement of data to and from a cloud-tier storage facility overcome long standing yet heretofore unsolved technological problems associated with determining which data is "hot" or "cold" and when and how migration of such data should be carried out.

Many of the herein-disclosed embodiments for using built-in capabilities of an information lifecycle manager to handle the movement of data to and from a cloud-tier storage facility are technological solutions pertaining to technological problems that arise in the hardware and software arts that underlie bare metal clouds.

Some embodiments include a sequence of instructions that are stored on a non-transitory computer readable medium. Such a sequence of instructions, when stored in memory and executed by one or more processors, cause the one or more processors to perform a set of acts for using built-in capabilities of an information lifecycle manager to handle the movement of data to and from a cloud-tier storage facility.

Some embodiments include the aforementioned sequence of instructions that are stored in a memory, which memory is interfaced to one or more processors such that the one or more processors can execute the sequence of instructions to cause the one or more processors to implement acts for using built-in capabilities of an ILM to handle the movement of data to and from a cloud-tier storage facility.

In various embodiments, any combinations of any of the above can be combined to perform any variations of acts for hibernating and resuming a computing cluster using facilities of an ILM, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1B1, FIG. 1B2 and FIG. 1B3 illustrate computing environments in which cluster resume after hibernation techniques can be practiced, according to an embodiment.

DETAILED DESCRIPTION

Figure 1A:
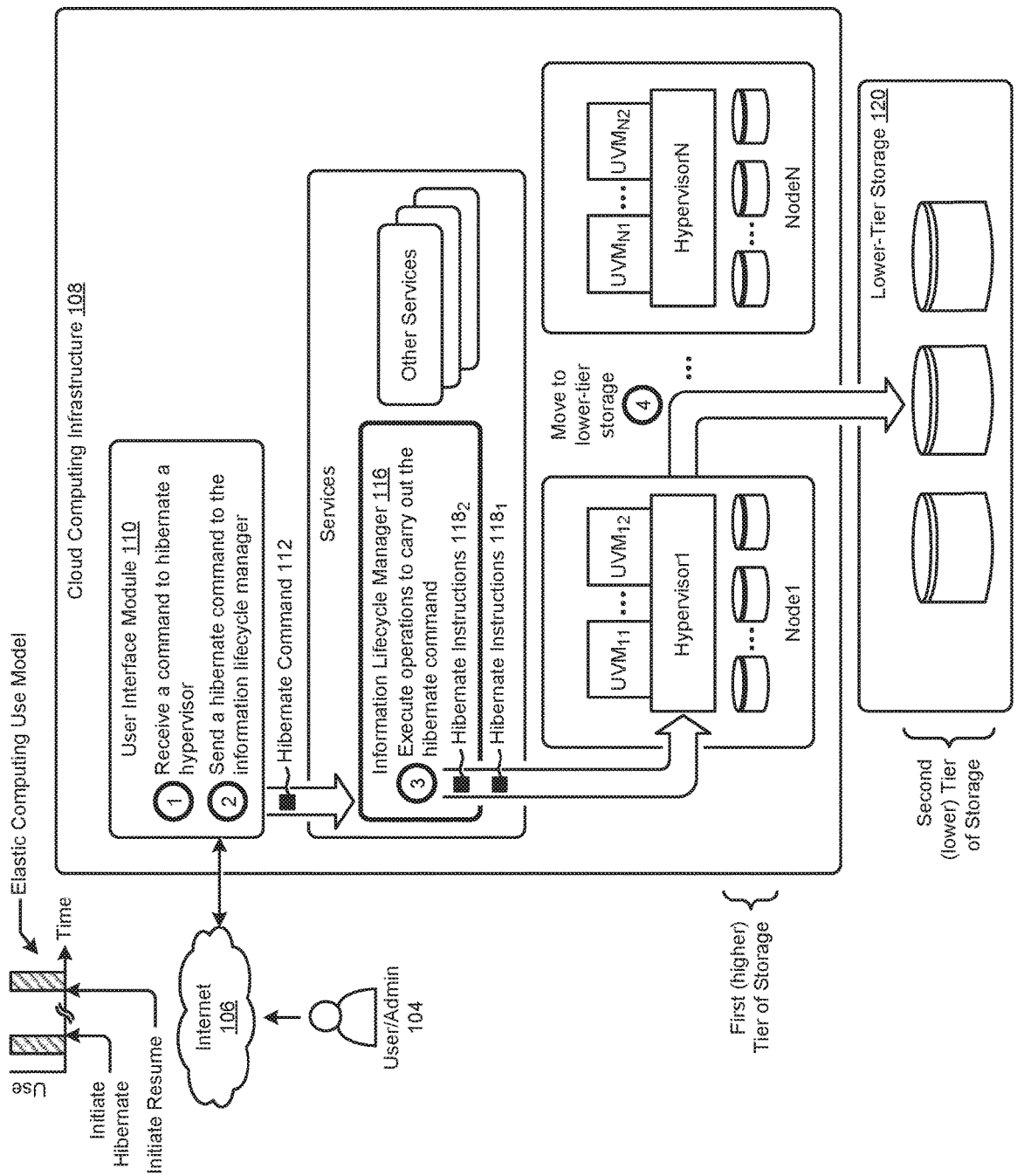
FIG. 1A illustrates a computing environment in which cluster hibernation techniques can be practiced, according to an embodiment.

Aspects of the present disclosure solve problems associated with using computer systems for determining when and how hibernation of computing clusters, along with their virtualization systems and VMs running on it, should be carried out. These problems are unique to, and may have been created by various computer-implemented methods for dealing with movement of data of compute clusters in the context of bare metal clouds. Some embodiments are directed to approaches for using built-in capabilities of an information lifecycle manager to handle the movement of data to and from various tiers of a multi-tier storage facility. The accompanying figures and discussions herein present example environments, systems, methods, and computer program products for hibernating and resuming a computing cluster using facilities of an ILM.

Overview

Hibernate and resume functions are provided for use on certain computing clusters. Some cluster node hibernate and cluster node resume functions are integrated into a graphical user interface such that a customer can, with a single click, shutdown a node of a computing cluster, release corresponding computing resources, and thus stop incurring resource usage costs that are tallied by the computing resource provider. A single click resume can be integrated into a graphical user interface as well. Upon a user indication, a node resume facility brings the computing node back with the same configuration state and user data storage state as was present when the node was hibernated.

Unlike on-premises (i.e., on-prem) clusters, it often happens that cloud clusters are ephemeral. That is, shutdown of a cluster node instance followed by a restart of the 'same' cluster node instance would not have the same 'old' data in a state prior to the shutdown. This is because the new cluster node instance is brought-up on pristine, data cleaned hardware and thus, all the disks would contain 'nulled-out' data.

A hibernate function of a computing cluster initiates activities of the system such that all the data pertaining to the nodes of the cluster—including cluster configuration and user data—are persisted on storage for later retrieval. A resume function of the computing cluster initiates activities in the system such that a hibernated cluster is recreated in such a way that all the previously persisted data is restored into a node of a target computing cluster.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a computing environment in which cluster hibernation techniques can be practiced. As an option, one or more variations of computing environment 1A00 or any aspect thereof may be implemented in the context of the architecture and functionality of the embodiments described herein and/or in any in any environment.

The figure illustrates a computing system (e.g., cloud computing infrastructure 108) that hosts a virtualization system distributed across multiple computing nodes (e.g., Node1, . . . , NodeN). The illustrated computing system has multiple tiers of storage; specifically, and as shown, a first, higher storage tier is hosted within a computing node and is associated with hypervisors (e.g., hypervisor1, . . . , hypervisorN) and user virtual machines of that node (e.g., $UVM_{11}$, $UVM_{12}$, $UVM_{N1}$, $UVM_{12}$). A second, lower storage tier is situated outside of the nodes. Communication to the lower-tier storage 120 can be carried out by any of (1) the hypervisors, (2) the virtual machines, (3) an information lifecycle manager hosted in the cloud computing infrastructure, or (4) an information lifecycle manager (ILM) and/or other services hosted in locations outside of the cloud computing infrastructure and accessible over Internet 106.

The shown computing environment supports hibernation and resuming of nodes of a virtualization system. As used herein, the verbs to "hibernate" and to "resume" and/or "to hibernate a hypervisor" or "to resume a hypervisor" refer to saving and restoring states of a hypervisor, including any state or states of any subordinate virtual machines and/or any subordinate virtual disks, and including any state or states of the node's hardware that might influence the behavior of the hypervisor. The saving actions preserve the state of the hypervisor and its environment in a non-volatile location such that the state can be restored at a later moment in time. The state of the hypervisor might include a list of running virtual machines and/or applications, and for each such virtual machine or running application, the state might include a corresponding running state of the virtual machine or application, possibly including the existence and state of any networking resources and/or the existence and state of any other computing devices.

As used herein, an information life cycle manager (ILM) is a computing module or collection of computing modules that manage the flow of data and its metadata over time. Managing the flow encompasses enforcing policies that specify where a particular data item should be stored, how many copies of it should be stored, and for what duration and into what storage tier or tiers the data item should be stored at any particular moment in time. An ILM is able to observe changes to real or virtual storage devices, including additions of new real or virtual storage devices and/or upgrades to any real or virtual storage devices, and/or operational state changes (e.g., online, offline, mounted, not mounted, etc.) of real or virtual storage devices, and/or deletion of real or virtual storage devices.

The figure is being presented to illustrate how an entire virtualization system on a particular node (e.g., Node1, . . . , NodeN) can hibernated efficiently using the shown ILM. As earlier discussed, one motivation for hibernating a node is to avoid costs associated with usage of cloud computing infrastructure resources where there is expected to be a period of non-use of the computing infrastructure resources. This situation occurs frequently in an elastic computing use model. More specifically, one way to avoid costs associated with usage in an elastic computing use model of in a cloud computing setting is to capture the entire state of the virtualization system into a storage object, and then to store that object in a lower-tier storage facility (e.g., into lower-tier networked storage or into still lower-tier object storage).

The determination of when to initiate hibernation can be done by a human (e.g., by a user or an administrator) or by a computing agent (e.g., a migration agent or by an information lifecycle management agent). In the former case, where the determination of when to initiate hibernation can be done by a user or an administrator, the user or administrator might take advantage of the elastic computing model by determining a time to initiate a hibernation action and by determining a time to initiate a resume action. Strictly as one example, once the time to hibernate has been determined by a user/admin 104, the user/admin can access a user interface module 110. The interface module in turn can process inputs from the user/admin such as to receive a command to hibernate a hypervisor (operation 1) and then send a hibernate command 112 to information lifecycle manager 116 (operation 2). The ILM can, in turn, execute operations to carry out the hibernate command (operation 3) which, as shown, includes commands to move the virtualization system to a lower-tier storage 120 (operation 4).

In this and other implementations, the information lifecycle manager has visibility into the entire virtualization system, including all of it system data and configuration data and all of the user data. Moreover, in this and other implementations, the ILM has visibility into, and/or is driven by policies that govern the uses of data through the data's lifecycle. Strictly as examples, the information lifecycle manager has visibility into a policy or policies that pertain to high availability of the virtualization system. This and other examples are given in Table 1.

TABLE 1

| Information lifecycle manager (ILM) cognizance | |
| --- | --- |
| Data Item | Visibility/Actions |
| User Data | Virtual disk create, read, write, delete, retention in accordance with a retention policy, etc.. |
| Metadata | All virtual disk data has corresponding metadata that is managed by the ILM. |

TABLE 1-continued

Information lifecycle manager (ILM) cognizance

| Data Item | Visibility/Actions |
|---|---|
| Replicated Data | The ILM has visibility into data modifications and policies for replication. |
| System Data | The ILM can distinguish between system data and user data. System data, including hypervisor state, root disk location, and contents are disk contents are visible and can be acted upon by the ILM. |
| Log and Audit Data | The ILM is responsible for maintaining logging facilities, data path logs, redo logs, undo logs, audit trail logs, etc. |

The information lifecycle manager is configured to be able to emit instructions to operational elements that are themselves configured to follow the instructions. Strictly as one example, and as shown, the ILM is configured to emit hibernate instructions (e.g., hibernate instructions $118_1$, and hibernate instructions $118_2$) to a hypervisor. In other embodiments the ILM is configured to be able to emit hibernate or other instructions to operational elements other than a hypervisor. Strictly as one example of this latter case, an information lifecycle manager can be configured to emit storage-oriented instructions to a storage facility such as the shown lower-tier storage 120. As such, an ILM is able to orchestrate all activities that might be needed to hibernate an entire computing node by saving the entirety of the then-current state of the node and then to offload the saved data to a lower tier of storage.

When comporting with the foregoing mechanism for cluster hibernation, it is possible to restore the saved node and bring the node to an operational state via a cluster resume mechanism. Various implementations of a cluster resume mechanism are shown and discussed as pertains to FIG. 1B1, FIG. 1B2, and FIG. 1B3.

FIG. 1B1 illustrates a computing environment 1B100 in which cluster resume after hibernation techniques can be practiced. As an option, one or more variations of computing environment 1B100 or any aspect thereof may be implemented in the context of the architecture and functionality of the embodiments described herein and/or in any in any environment.

The figure is being presented to illustrate how an information lifecycle manager can orchestrate all activities that might be needed to resume an entire computing node by restoring the entirety of the then-current state of the node from data objects that had been saved to a lower tier of storage in response to a hibernate command. The environment as shown in FIG. 1B is substantially the same as the environment as shown in FIG. 1A, however the commands, instructions and actors on the instructions are different in the resume regime as compared with the hibernate regime.

Strictly as one example, when a time to resume has been determined by user/admin 104, the user/admin can access a user interface module 110 via internet 106, which in turn can process inputs from the user/admin such as to receive a resume indication (operation 5) and then send a resume command 113 to information lifecycle manager 116 (operation 6). The ILM can, in turn, execute operations to carry out the resume command (operation 7) which, as shown, includes resume instructions (e.g., resume instructions $119_1$, resume instructions $119_2$) to move the virtualization system from lower-tier storage 120 (operation 8) to a target node.

In this manner, an entire cluster can be hibernated, node by node until all virtualization systems of all nodes of the entire cluster have been hibernated. Once the virtualization system has been moved from the lower-tier storage to the memory of a target node, operation of a hibernated node can be resumed from exactly the same state as was present when the node was saved under the hibernate regime.

The specific embodiment of FIG. 1B1 depicts the same node, (i.e. node1) as being the same subject node of both the hibernate command and the resume command. In many situations, however, the subject node of the resume command is different than the subject node of the hibernate command. One example of this is shown in FIG. 1B2. Specifically, when performing operation 8, an alternate node (i.e., node nodeALT) is designated as the subject node for the resume. This scenario, where the subject node of the resume command is different than the subject node of the hibernate command is common in cloud computing settings.

The specific embodiment of FIG. 1B3 includes a second cloud computing facility (e.g., alternate cloud computing facility 109) that provisions infrastructure that is different from the foregoing cloud computing infrastructure 108. The ILM and/or any cooperating agents (e.g., the shown multi-cloud management facility 117) are able to carry out node hibernate operations on a first cloud, and then carry out node resume operations to a different cloud. In this manner an entire cluster can be migrated, node by node from one cloud provider to another cloud provider. In some cases, a cluster can be formed from nodes that span different clouds.

Further details pertaining to hibernation technique and resume technique are shown and described hereunder.

Figure 2A:
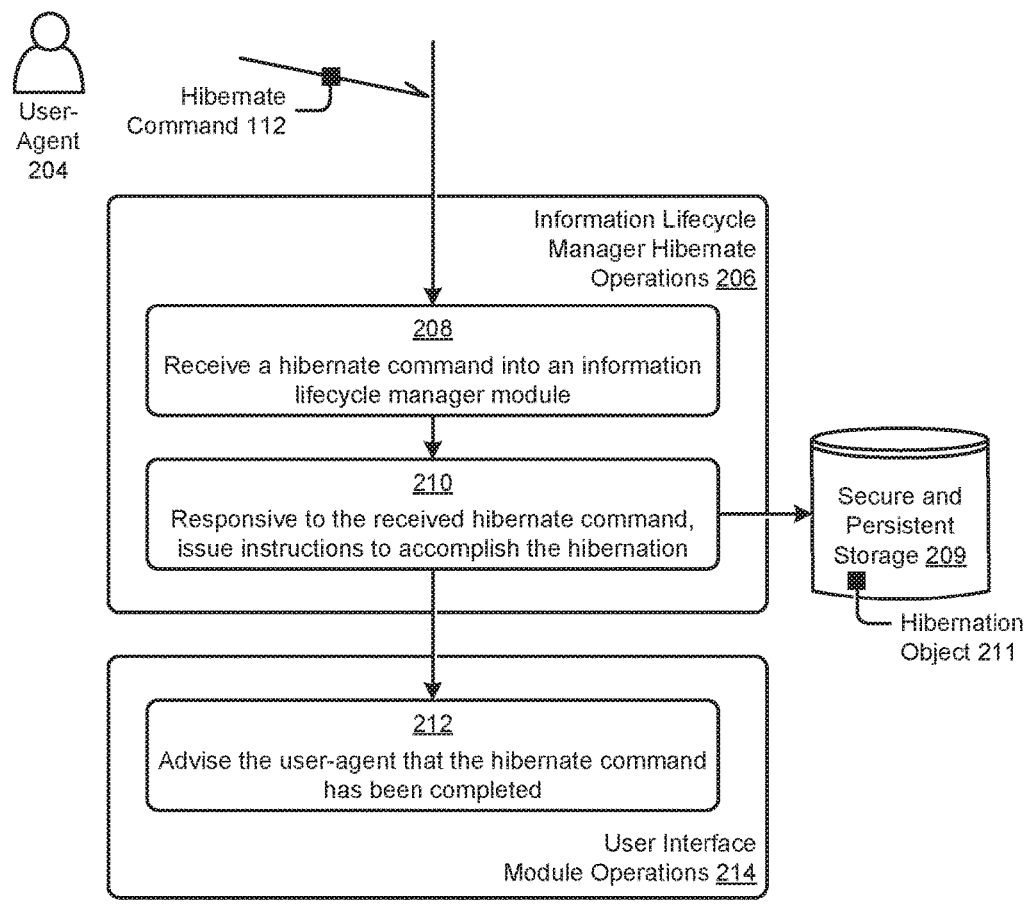
FIG. 2A shows a cluster node hibernation technique as used in systems that hibernate and resume of a computing cluster node using facilities of an information lifecycle manager, according to an embodiment.

FIG. 2A shows a cluster node hibernation technique 2A00 as used in systems that hibernate and resume of a computing cluster node using facilities of an information lifecycle manager. As an option, one or more variations of cluster node hibernation technique 2A00 or any aspect thereof may be implemented in the context of the architecture and functionality of the embodiments described herein and/or in any in any environment.

The elastic computing use model supports running of a workload—or many instances of a workload—at such time as the computing corresponding to the workloads is needed. For example, a workload might be a virtual desktop, and the computing resources corresponding to running the virtual desktop might only be needed when the user is actually using the virtual desktop. As such it might be felicitous to release the computing resources corresponding to running the virtual desktop when the user is logged out or otherwise not actually using the virtual desktop. The cluster node hibernation technique 2A00 might be invoked when the user is logged out (i.e., when the user is deemed to be not actually using the virtual desktop). This cluster node hibernation technique extends to scenarios where there are many users running many virtual desktop machines on the same node. For example, all of the members of the "marketing team" might be assigned to respective virtual desktop machines that are hosted on the same node. It can happen that all of the members of the "marketing team" might be logged out, and might be logged out for an extended period (e.g., overnight, during "off hours", over the weekend, etc.). In such cases, it might happen that a user-agent 204 might raise a hibernate command 112. In some cases, the user-agent 204 is a module of the ILM.

In the embodiment shown, the information lifecycle manager hibernate operations 206 commence when a hibernate command is received into an information lifecycle manager module (step 208) then, responsive to the received hibernate command, the ILM issues instructions (step 210) to any operational elements such that the hibernate command is carried out and a hibernation object 211 is produced and stored in secure and persistent storage 209 for later retrieval in the context of a resume scenario. In some cases the hibernation object 211 is stored in a persistent and secure storage facility that is geographically distant from the subject cluster, thus providing high availability aspects afforded by offsite storage.

The hibernation object may be organized using any known data storage techniques. Strictly as a nonlimiting example, a hibernation object can be organized in accordance with the descriptions of Table 2.

TABLE 2

Hibernation object organization

| Type | Contents | Data Representation |
| --- | --- | --- |
| Owner | Parent cluster ID | Text or number |
| Node Manifest | Node IDs | Text or numbers |
| VM Manifest | VM IDs | Text or numbers |
| Hypervisor Manifest | VMs [ ] and corresponding virtual resources [ ] | Array, nested arrays |
| Data State | Virtual resource persistent storage [ ] | Objects |
| Hypervisor State | Hypervisor settings | Hypervisor-specific data structure |
| Service State | Images [ ] and processor status words [ ] | Guest OS-dependent data structure |

Once the hibernate command has been carried out, a user interface module is triggered to advise the user-agent that the hibernate command has been completed (step 212). The particular partitioning of step 212 to be carried out by a user interface module (e.g., as depicted by the boundary of user interface module operations 214) is merely one example partitioning and other partitions or operational elements may participate in operations that are carried out after the information lifecycle manager hibernate operations 206 have been completed.

The foregoing cluster node hibernation technique 2A00 contemplates that the node that had been hibernated and offloaded to a lower-tier storage site would be resumed at some later moment in time. A cluster node resume technique is shown and described as pertains to FIG. 2B.

Figure 2B:
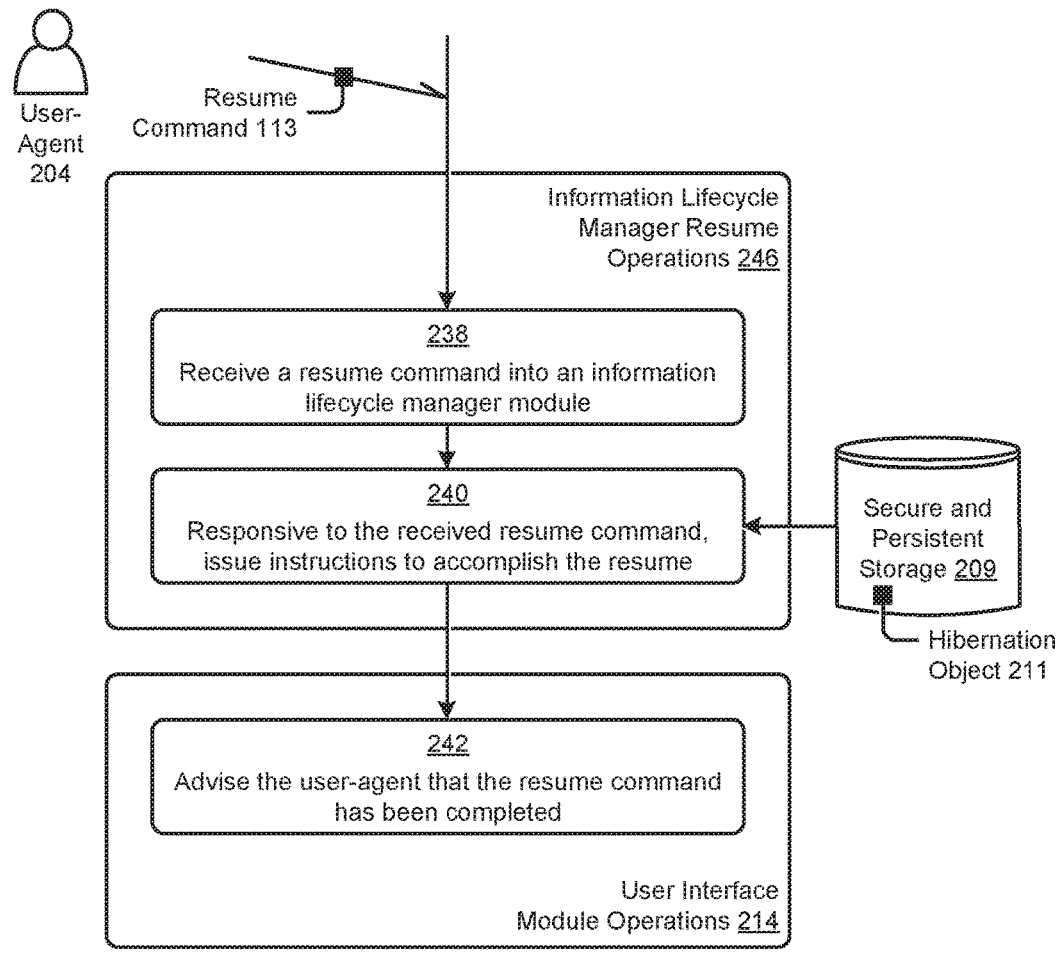
FIG. 2B shows a cluster node resume technique as used in systems that hibernate and resume of a computing cluster node using facilities of an information lifecycle manager, according to an embodiment.

FIG. 2B shows a cluster node resume technique 2B00 as used in systems that hibernate and resume of a computing cluster node using facilities of an information lifecycle manager. As an option, one or more variations of cluster node resume technique 2B00 or any aspect thereof may be implemented in the context of the architecture and functionality of the embodiments described herein and/or in any in any environment.

As heretofore discussed, it can happen that all of the members of a marketing team might be logged out, and might be logged out for an extended period (e.g., overnight, during "off hours", over the weekend, etc.); however, that period will eventually expire and it might be that some or all of the members of the marketing team might again want to use their virtual desktop machine. In such a case, it might happen that a user-agent 204 might raise a resume command 113.

As shown, the information lifecycle manager resume operations 246 commence when the resume command 113 is received into an information lifecycle manager module (step 238) then, responsive to the received resume command, the information lifecycle manager issues instructions (step 240) to any operational elements such that the resume command is carried out. Once the resume command has been carried out, a user interface module is triggered to advise the user-agent that the resume command has been competed (step 242). Step 242 may be carried out by any operational element, including by a user interface module. The shown partitioning is merely one example partitioning and other partitions or operational elements may participate in operations that are carried out after the information lifecycle manager resume operations 246 have been completed. Other partitions are shown and described as pertains to the system of FIG. 3A.

Figure 3A:
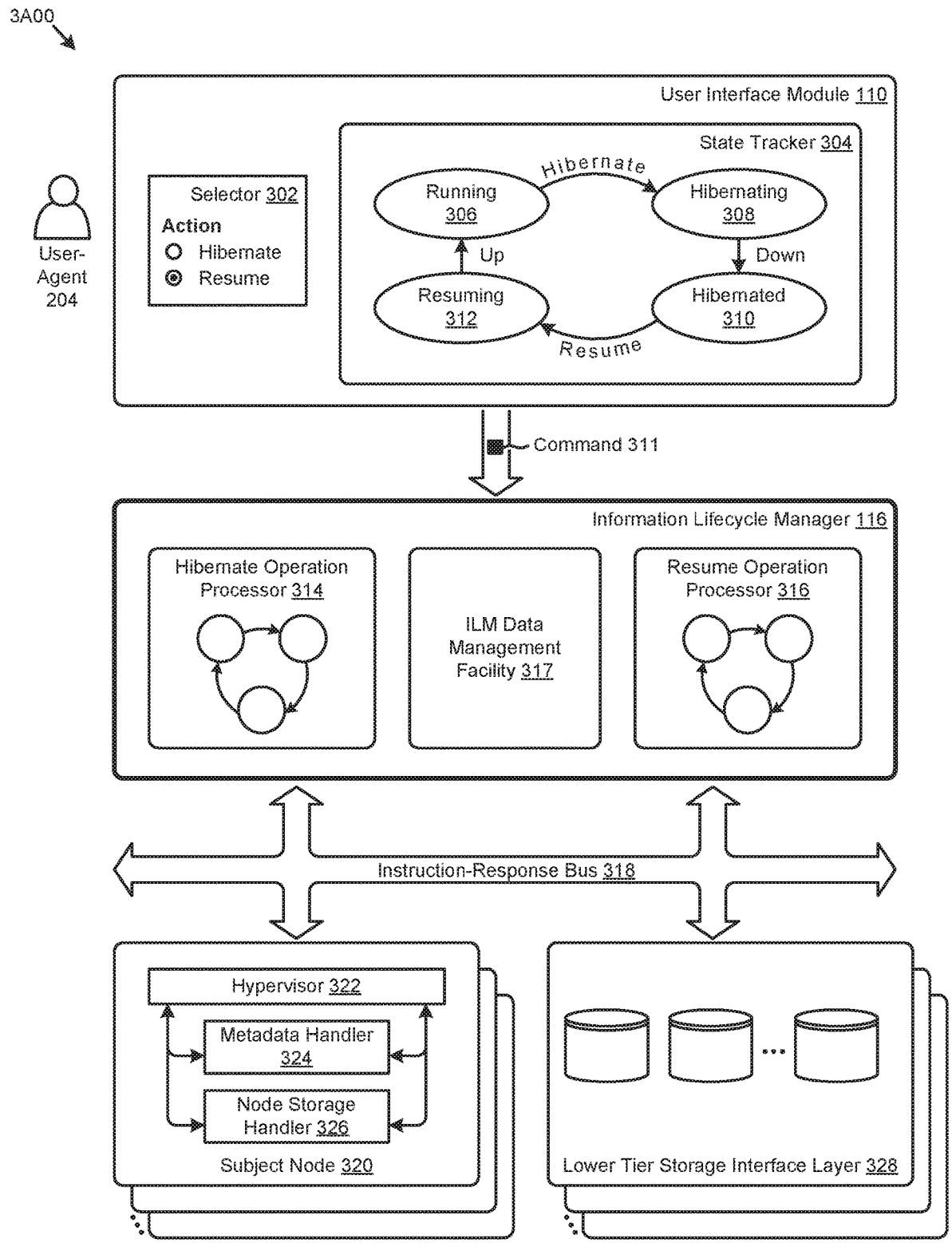
FIG. 3A depicts a system for hibernating and resuming a computing cluster using facilities of an information lifecycle manager, according to an embodiment.

FIG. 3A depicts a system 3A00 for hibernating and resuming a computing cluster using facilities of an information lifecycle manager. As an option, one or more variations of system 3A00 or any aspect thereof may be implemented in the context of the architecture and functionality of the embodiments described herein and/or in any in any environment.

The figure is being presented to offer one possible system-level partitioning. As shown, a user interface module receives indications from a user-agent 204 and raises a command 311 that is processed by information lifecycle manager 116. The information lifecycle manager can, in turn, conduct communications (e.g., over instruction-response bus 318) with any instance of a subject node 320 and/or with any instance of a lower tier storage interface layer 328.

In this particular embodiment, the user interface module 110 includes a state tracker 304 that keeps track of movements between states of representative components of a virtualization system (e.g., the hypervisor 322, metadata handler 324, node storage handler 326, etc.). The particular states of representative components of a virtualization system (e.g., running 306, hibernating 308, hibernated 310, and resuming 312) are tracked in a manner such that an interface (e.g., selector 302) can be presented to a user-agent 204. Based at least in part on the then-current state, and based at least in part on the possibilities for a next state, the selector 302 offers only the possible options. In some embodiments, the possible options are presented in a graphical user interface. In other embodiments, the possible options are accessible by an application programming interface (API).

As shown, the information lifecycle manager includes a hibernate operation processor 314 and a resume operation processor 316. The hibernate operation processor 314 keeps track of hibernation states as well as instructions and responses that are sent and received over the instruction-response bus, whereas the resume operation processor 316 keeps track of resume states as well as instructions and responses that are sent and received over the instruction-response bus. In some scenarios, the instructions that are sent over the instruction-response bus correspond to specified intents. As such, the movement from state to state within information lifecycle manager 116 can occur asynchronously. Moreover, in event of a timeout before moving from one state to another state, any of the specified intents can be remediated based on a set of then-current conditions.

Further details regarding general approaches to hibernating and resuming a hypervisor are described in U.S. Pat. No. 10,558,478 titled "SPECIFICATION-BASED COMPUTING SYSTEM CONFIGURATION", filed on Dec. 14, 2017, which is hereby incorporated by reference in its entirety.

As earlier indicated, the ILM can carry out communications with any instance or number of instances of subject nodes. In some cases, a subject node of a resume operation is the same type of node as was the subject node of the hibernate operation. In other cases, a subject node of a resume operation will be a different type of node as was the subject node of the hibernate operation. In either case, the hibernate operation and restore operation can be facilitated by a hypervisor save function and a hypervisor restore function.

Figure 3B:
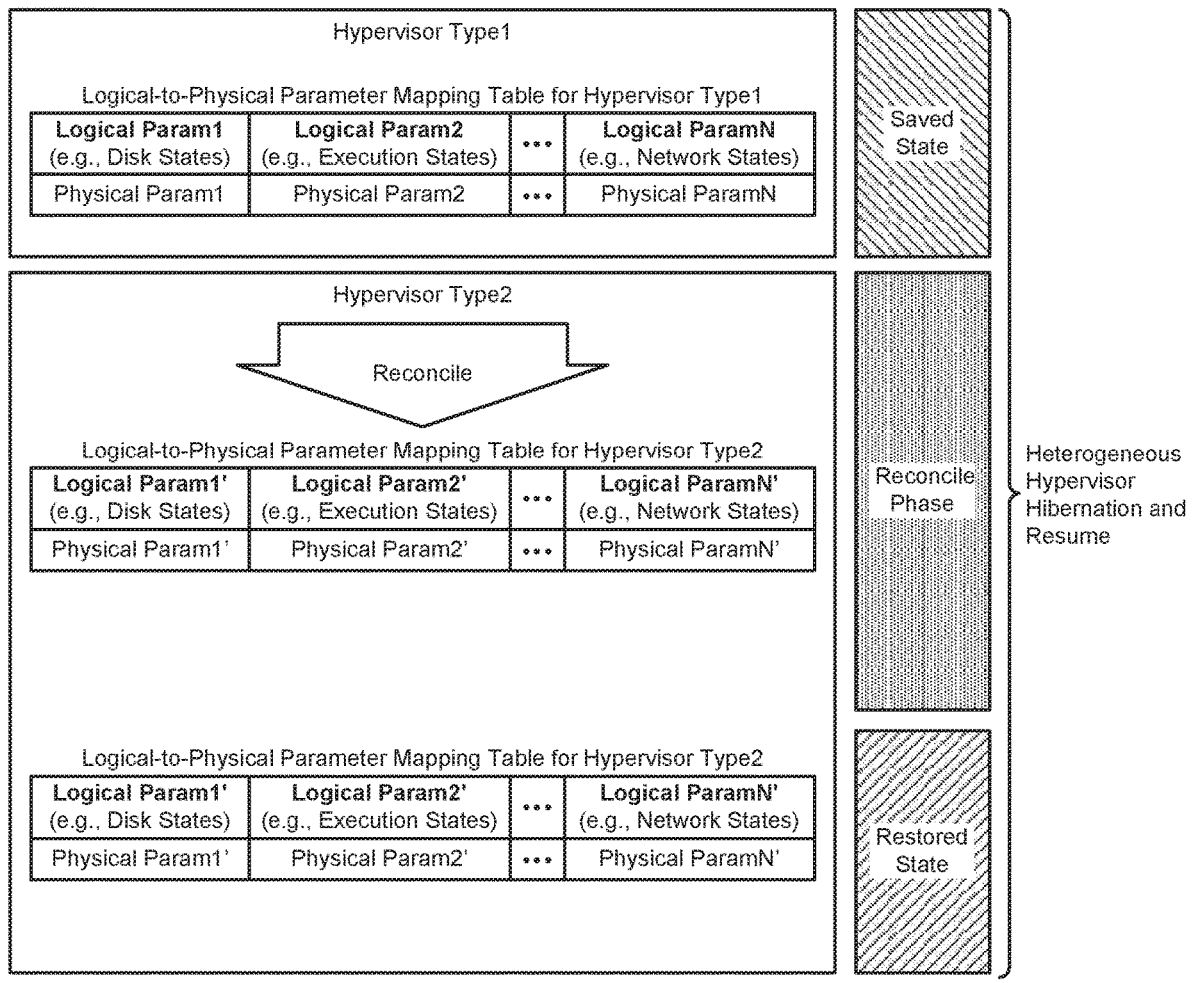
FIG. 3B depicts a hypervisor parameter reconciliation technique for hibernating and resuming a between heterogeneous nodes, according to an embodiment.

FIG. 3B depicts a hypervisor parameter reconciliation technique 3B00 for hibernating and resuming a between heterogeneous nodes, according to an embodiment. As an option, one or more variations of technique 3B00 or any aspect thereof may be implemented in the context of the architecture and functionality of the embodiments described herein and/or in any in any environment.

The figure is being presented to show how a hypervisor parameter reconciliation technique 3B00 can be applied when implementing hypervisor save and restore techniques across heterogenous hypervisors platforms. FIG. 3B illustrates aspects pertaining to hibernating a hypervisor and its virtual machine before moving the virtual machine and its hypervisor states to a different host computing system. Specifically, the figure is being presented with respect to its contribution to addressing the problems of quiescing and moving a virtual machine and its hypervisor states to a different type of hypervisor.

The embodiment shown in FIG. 3B is merely one example. The hypervisor parameter reconciliation technique depicts how logical parameters are mapped to physical parameters. When hibernating a first hypervisor of a first type in advance of moving the states to a second hypervisor of a second type, various logical parameters pertaining to the first hypervisor type are mapped to the physical parameters of the second hypervisor. Then, when the restore function of the second hypervisor is invoked, the reconciled logical parameters are restored into the second hypervisor, thus recreating the state of the first hypervisor as of the time the first hypervisor was hibernated.

Further details regarding general approaches to hibernating and resuming a hypervisor are described in U.S. patent application Ser. No. 16/778,909 titled "HYPERVISOR HIBERNATION", filed on Jan. 31, 2020, which is hereby incorporated by reference in its entirety.

Figure 4A:
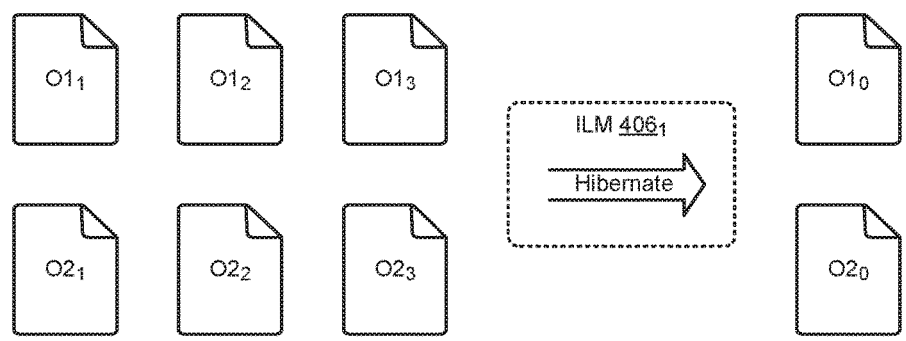
FIG. 4A exemplifies a data space conservation technique as applied when hibernating a computing cluster using facilities of an information lifecycle manager, according to an embodiment.

FIG. 4A exemplifies a data space conservation technique as applied when hibernating a computing cluster using facilities of an information lifecycle manager. As an option, one or more variations of data space conservation technique 4A00 or any aspect thereof may be implemented in the context of the architecture and functionality of the embodiments described herein and/or in any in any environment.

The figure is being presented to shown how an information lifecycle manager can conserve data storage space when hibernating a computing cluster. The figure depicts merely one example of a high-availability configuration where a replication factor is activated; that is, where each object is replicated N number of times. An ILM has visibility into object creation and is thus able to implement a replication factor. Accordingly, since an information lifecycle manager has visibility into object creation and is able to implement a replication factor, it is also able to suppress unnecessary duplication of objects when hibernating.

In most scenarios, when an object is stored into an object storage facility of a cloud, that object is replicated by the cloud vendor, therefore it is unnecessary to replicate the replicas. This action to suppress unnecessary additional replication of an already replicated object is shown schematically where the three copies of object O1 (e.g., $O1_1$, $O1_2$, and $O1_3$) are reduced to storage of only one copy of object O1 (e.g., $O1_0$). This action by the hibernate operation of ILM $406_1$ to suppress unnecessary additional replications is carried out over all objects (e.g., $O2_1$, $O2_2$, and $O2_3$) of the cluster so as to reduce to storage of only one copy of each object (e.g., $O2_0$) in the hibernation object.

The foregoing is merely one example of a policy or setting that can be comprehended and acted on by an ILM when responding to hibernation and resume commands. As additional examples, (1) the ILM can observe a privacy setting so as to perform data encryption or decryption when responding to hibernation and resume commands; (2) the ILM can exploit network infrastructure and conditions by performing parallel I/O transfers when responding to hibernation and resume commands; and (3) the ILM can interact with human-computer interfaces to show data movement progress monitoring when responding to hibernation and resume commands.

Figure 4B:
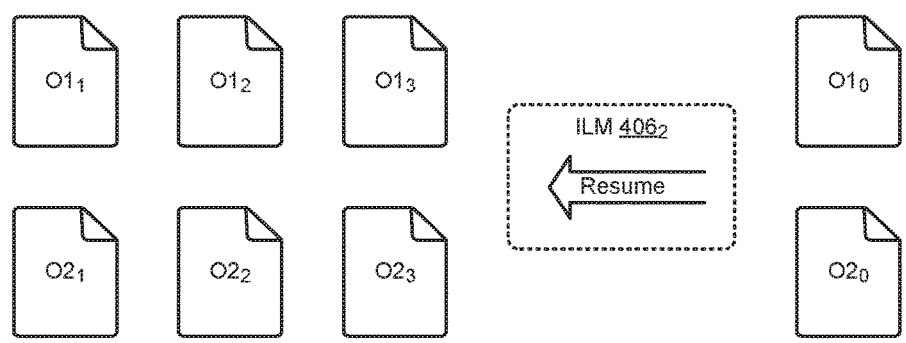
FIG. 4B exemplifies a high-availability data restoration technique as applied while resuming a computing cluster using facilities of an information lifecycle manager, according to an embodiment.

FIG. 4B exemplifies a high-availability data restoration technique 4B00 as applied while resuming a computing cluster using facilities of an information lifecycle manager. As an option, one or more variations of high-availability data restoration technique 4B00 or any aspect thereof may be implemented in the context of the architecture and functionality of the embodiments described herein and/or in any in any environment.

The figure is being presented to shown how an information lifecycle manager can restore a high-availability configuration when resuming a computing cluster. The figure depicts merely one example of a high-availability configuration where a replication factor is re-activated when resuming a computing cluster. In most scenarios, when an object is stored into an object storage facility of a cloud, that object is replicated by the cloud vendor, therefore it is unnecessary to replicate the replicas. However, when resuming a cluster after hibernation, the replication factor that had been in force at the time of hibernation is to be restored. As such, the former action (i.e., during hibernation) to suppress unnecessary additional replications of an already replicated object is reversed. Specifically, and as shown, the three copies of object O1 (e.g., object $O1_1$, object $O1_2$, and object $O1_3$) that had been reduced to storage of only one copy of object O1 (e.g., object $O1_0$) are brought back into the resumed cluster with the same high-availability (e.g., replication factor) configuration as was present at the time of hibernation. This is depicted by the resume operation of ILM $406_2$ where single copies of objects (e.g., object $O1_0$ and object $O2_0$) are brought back into the resumed cluster as resumed (restored) objects (e.g., object $O1_1$, object $O1_2$, object $O1_3$, object $O2_1$, object $O2_2$, and object $O2_3$).

Figure 5:
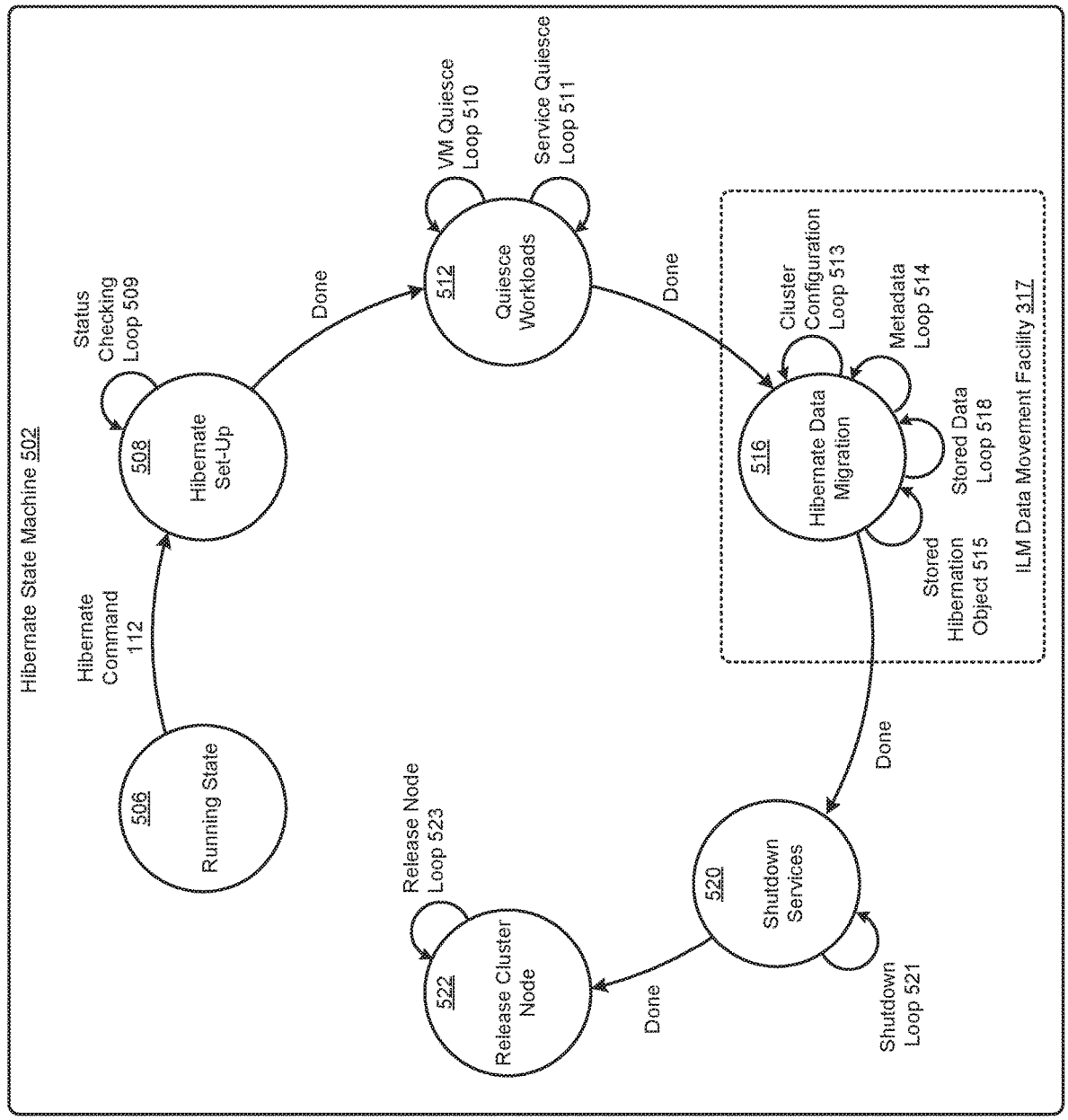
FIG. 5 depicts a state machine that implements a hibernate command as used for hibernating a node in systems that hibernate and resume of a computing cluster node using facilities of an information lifecycle manager, according to an embodiment.

FIG. 5 depicts a hibernate state machine 502 that implements a hibernate command as used for hibernating a node in systems that hibernate and resume of a computing cluster node using facilities of an information lifecycle manager. As an option, one or more variations of hibernate state machine 502 or any aspect thereof may be implemented in the context of the architecture and functionality of the embodiments described herein and/or in any in any environment.

The figure is being presented to illustrate how certain of the operations involved to carry out a cluster hibernation command 112 can be carried out within an information lifecycle manager. More specifically, the figure is being presented to provide an example of how the state transitions involved in carrying out a cluster hibernation command can be handled within a hibernate state machine 502 that is situated within an information lifecycle manager. The state machine transitions from state to state, from a running state 506 through to a state where the cluster node has been saved (state 516) such that the computing resources of the cluster node can be released (state 522).

As shown, a hibernate state machine 502 moves from a running state (e.g., state 506) to a hibernate set-up state (e.g., state 508) upon receipt of a hibernate command 112. Processing within this hibernate set-up state includes looping (e.g., in a status checking loop 509) to confirm that the conditions needed for movement into a quiesced state are present. This is because there are many asynchronous events happening in a running cluster, including cluster configuration changes.

Processing within the hibernate set-up state including the aforementioned looping ensures that the configuration of the cluster is stable. For example, the tests of status checking loop 509 may be configured to observe any in-process cluster node add or cluster node delete operations, and continuously loops until the cluster node constituency is stable. When the cluster node constituency is stable, the hibernate state machine moves to state 512 where quiescence operations are carried out in VM quiesce loop 510 and in service quiesce loop 511. More specifically, any of the virtual machines and/or services that had been running on the cluster are signaled to quiesce and to report achievement of their quiescence to the ILM. A quiescent state of a virtual machine includes at least that any formerly in-process computing and I/O (input/output or IO) has been completed or suspended.

As such, the operational states of the virtual machines and their data (e.g., user data, system data, metadata) are known and unchanging. When this is accomplished, the hibernate state machine moves to the hibernate data migration state (e.g., state 516) where the ILM data movement facility 317 serves to perform data movement. Since the ILM has visibility into all aspects of user and system data creation, metadata creation, in-flight data and metadata movement, storage tier capacities, storage tier I/O capabilities, then-current utilization, etc., the ILM can make decisions as to which data is to be saved into a hibernation object (e.g., stored hibernation object 515), and how the data is to be saved into the hibernation object.

In the shown embodiment, this is accomplished by operation of stored data loop 518 that moves user and system data into a hibernation object, by operation of cluster configuration loop 513 that moves details pertaining to the allocated resources into a system manifest portion of the hibernation object, and by operation of metadata loop 514 that moves metadata of the cluster into the hibernation object. Once all of the data and metadata of the quiesced cluster has been stored into the hibernation object, any still running (but quiesced) services of the cluster can be shutdown. During shutdown of services (e.g., in state 520), a shutdown loop 521 is entered such that any number of services can be shut down in any order as may be prescribed by any interrelationship between the services. When all of the services of the cluster have been successfully shut down, processing of the hibernate state machine 502 moves to the next state; specifically, to release the cluster node (state 522). A cluster comprised of a plurality of nodes and any amounts of other computing resources can be released in a loop (e.g., release node loop 523) such that multiple nodes of the subject cluster can be released back to the resource provider.

At this time, the entire state of the cluster node or nodes, including states of all hypervisors, all of its virtual machines, all of its virtual disks, etc. have been saved into a hibernation object which is stored into a secure and persistent location for later access (e.g., for responding to a cluster resume after hibernation command).

Figure 6:
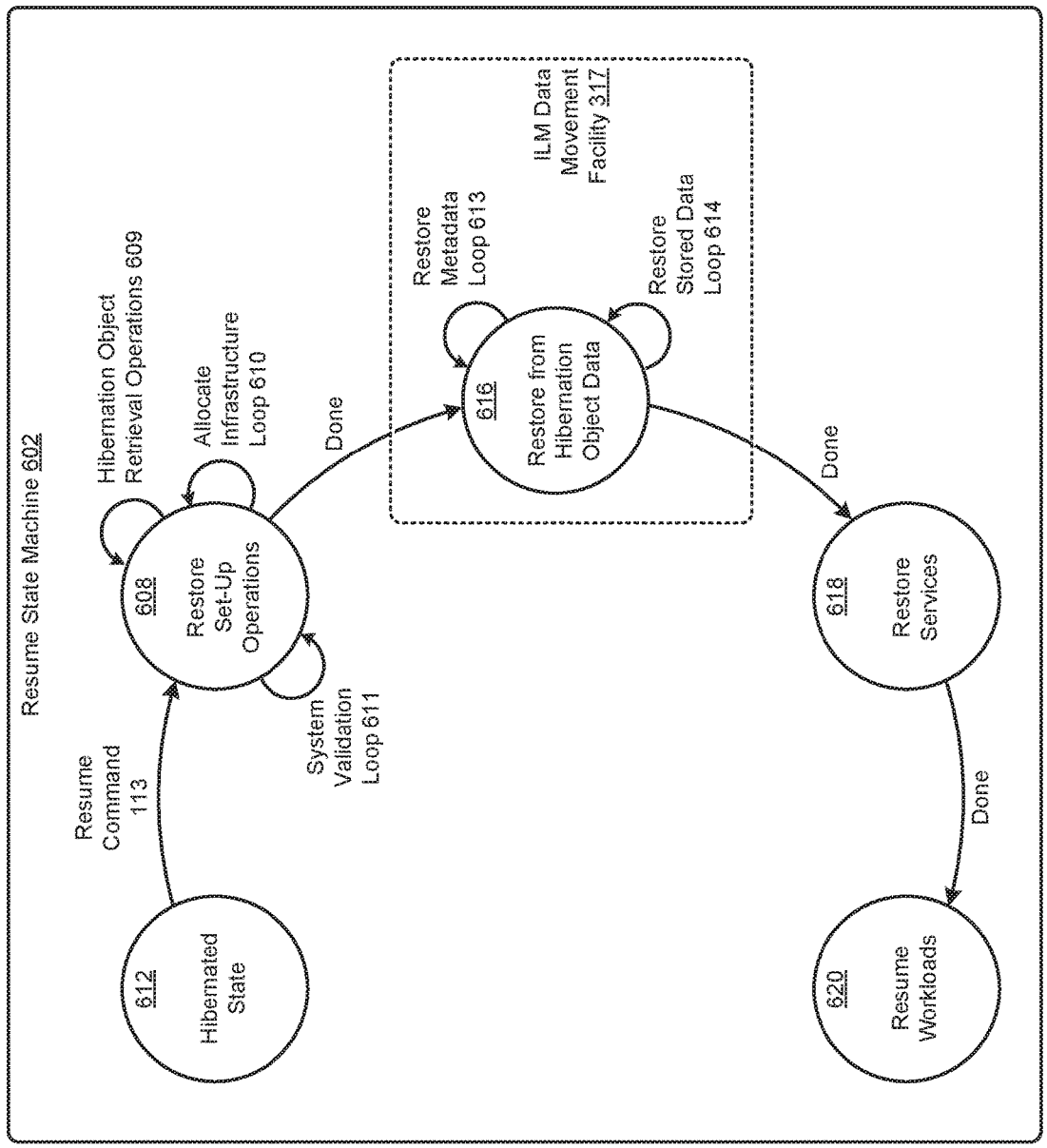
FIG. 6 depicts a state machine that implements a resume after hibernation command as used for resuming a node in systems that hibernate and resume of a computing cluster node using facilities of an information lifecycle manager, according to an embodiment.

FIG. 6 depicts a resume state machine 602 that implements a resume after hibernation command as used for resuming a node in systems that hibernate and resume of a computing cluster node using facilities of an information lifecycle manager. As an option, one or more variations of resume state machine 602 or any aspect thereof may be implemented in the context of the architecture and functionality of the embodiments described herein and/or in any in any environment.

The figure is being presented to illustrate how the operations involved to carry out a cluster resume command 113 can be carried out within the information lifecycle manager. More specifically, the figure is being presented to provide an example of how the state transitions involved to carry out a cluster resume command can be handled within a resume state machine 602 that is situated within an information lifecycle manager. The resume state machine transitions from state to state as shown, such as from a hibernated state 612 through to a state where the cluster has been restored (state 616) to a condition such that workloads on the cluster can be resumed (state 620).

As a result of traversal through the foregoing hibernate state machine 502 of FIG. 5, a hibernation object is created and stored. Safe storage of a hibernation object may continue indefinitely, which corresponds to hibernated state 612. Upon receipt of a resume command 113, the resume state machine 602 transitions to state 608 corresponding to restore set-up operations. During the performance of the restore set-up operations, the hibernation object corresponding to the cluster to be resumed is retrieved via hibernation object retrieval operations 609, and an allocate infrastructure loop 610 is entered. As earlier described, the hibernation object contains system configuration information as pertains to the computing resources that had been allocated prior to hibernation. As such, information in the hibernation object can be accessed so as to again allocate the needed computing resources.

It often happens that a later allocation of a node or resource is not the same node or resource of a previous allocation. In fact, it often happens that any new allocation request for a node or resource would be satisfied by the resource provide with a pristine resource. Since the computing resource returned in response to an allocation request is not, in most cases, the same computing resource as was previously released, the restore set-up operations include a system validation loop 611, which loops through the contents of the system manifest portion to validate that the newly-allocated computing resource is sufficiently configured to serve as a replacement for the previously released computing resource.

When all of the needed newly-allocated computing resources have been deemed to be sufficiently configured to serve as a replacement for the previously released computing resources, then the state machine moves to a restore from hibernation object data state (state 616) of the shown ILM data movement facility 317. Since the ILM has visibility into all aspects of user and system data creation, metadata creation, in-flight data and metadata movement, storage tier capacities, storage tier I/O capabilities, then-current utilization, etc., the ILM can make decisions as to where data is to be restored from the hibernation object. In the shown embodiment, this is accomplished by state 616 that serves to restore data from the hibernation object. During the course of restoring data from the hibernation object (state 616), two loops are entered. The two loops correspond to restoring data from the stored hibernation object to the newly-allocated resource (restore stored data loop 614) and restoring metadata from the stored hibernation object to the newly-allocated resource (restore metadata loop 613). The loops can be entered multiple times depending on the nature of the data states being restored (e.g., entering restore stored data loop 614 once for each vDisk that was indicated in the hibernation object). Moreover the operations pertaining to each loop can be performed sequentially, or in parallel, or in an interleaved manner.

Upon completion of restoring data from the hibernation object, the restore services state (state 618) is entered, whereupon services that were running on the node prior to hibernation are restarted. Upon completion of restarting the services that were running on the node prior to hibernation, the resumed node or nodes of the cluster are operational and the workloads that were running on the cluster prior to hibernation of the node or nodes can be resumed (state 620) from exactly the same state as when the workloads were quiesced during hibernation.

Additional Embodiments of the Disclosure

Figure 7A:
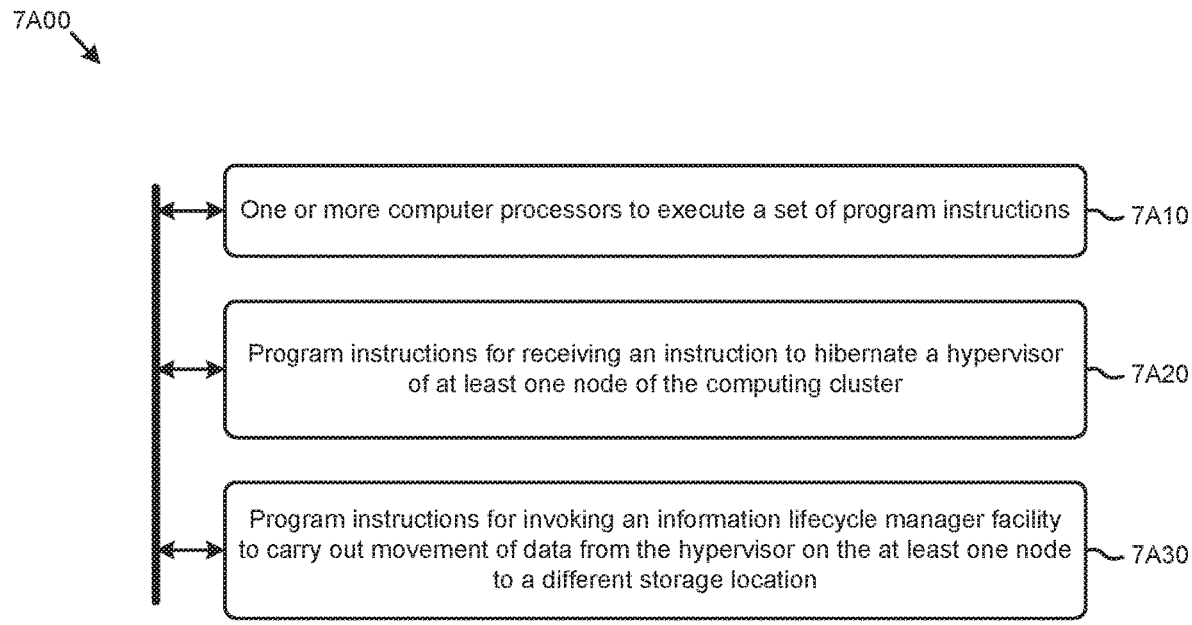
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address determining which data is "hot" or "cold" and when and how migration of such data should be carried out. The partitioning of system 7A00 is merely illustrative and other partitions are possible.

As shown, the system 7A00 includes a computer processor to execute a set of program instructions (module 7A10). The computer processor implements a method for hibernating a portion of a computing cluster by: receiving an instruction to hibernate a hypervisor of at least one node of the computing cluster (module 7A20); and invoking an information lifecycle manager facility to carry out movement of data from the hypervisor on the at least one node to a different storage location (module 7A30).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7B:
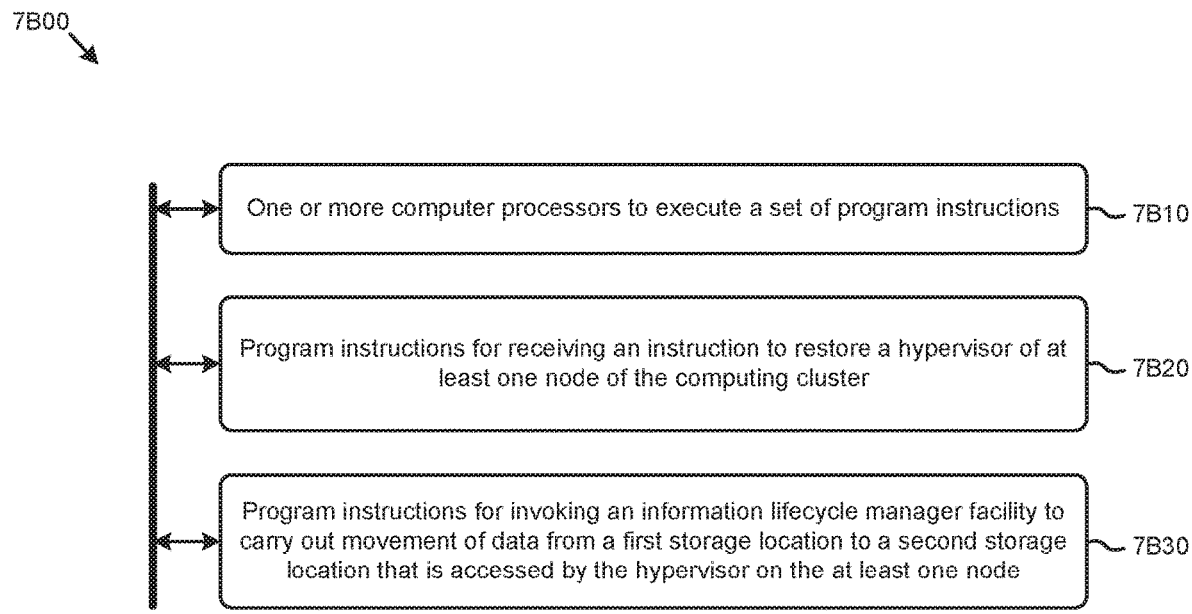

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible.

As shown, the system 7B00 includes a computer processor to execute a set of program instructions (module 7B10). The computer processor implements a method for restoring a portion of a computing cluster by: receiving an instruction to restore a hypervisor of at least one node of the computing cluster (module 7B20); and invoking an information lifecycle manager facility to carry out movement of data from a first storage location to a second storage location that is accessed by the hypervisor on the at least one node (module 7B30).

The foregoing are merely illustrative implementation examples. Many variations, implementations and use cases are possible, some aspects of which are discussed hereunder.

Additional Implementation Examples

Cluster Node Configuration and Overall System Configuration Data in a Controller Virtual Machine's A configuration is stored in a controller virtual machine's root disk and in a cluster configuration maintenance facility. When hibernating:
1. Cluster node configuration and overall system configuration data is saved and persisted for easy access since these files are accessed early in a node restart sequence;
2. Data path logs (e.g., for maintenance of high-availability) are saved;
3. User data is saved; and
4. Metadata pertaining to any of the foregoing data is saved in a manner for later restoration.

Hibernate Sequence
1. Get command to hibernate;
2. Change state to hibernating;
3. Call cloudProviderAPI_tools with argument "persist";
4. Call cloudProviderAPI_tools with "prepare-hibernate".

Restore Sequence
1. Call cloudProviderAPI_process disk;
2. Call cloudProviderAPI_process_startup;
3. Bring-up state machine.

Handling Metadata and vDisk Data

Some embodiments migrate user data from storage device instances to cloud object storage (e.g., to geographically distant object storage sites). By using the ILM to transfer data, the cognizance of the ILM is inherent. Specifically, features inherent in an ILM include dealing with (i) parallel IO transfers; (ii) progress monitoring; (iii) encryption; (iv) ability to transfer data in/out while VMs are still running; etc. Moreover, the ILM can transfer data from storage devices to cloud object storage-based storage by moving the extents from source to destination disks. In some embodiments, a cloud object storage based extent group manager is added to the cluster while hibernating and resuming. The objects stored can be composed of extent groups and their corresponding metadata.

Multi-Cloud Management Facility: Gateway Implemented Cluster Hibernate/Resume Examples After the multi-cloud management facility has put the cluster in 'Hibernating' state a gateway on the cluster drives an internal state machine for the cluster. The gateway uses the cluster configuration maintenance facility to maintain the current cluster state and also to communicate the state to other services in the cluster. All services participating in the hibernate operations are configured to be able to watch for state transitions.

In the following Table 3, state transitions from kStateXDone to kStateX+1 are processed by a gateway. The gateway watches for the state to move from kStateX to kStateXDone.

TABLE 3

| Start State -> End State | Operation |
|---|---|
| kRunning -> kHibernateSetup | Multi-cloud management facility sends a hibernate command to the gateway via a cluster agent.<br>The gateway executes hibernate pre-checks.<br>The gateway hibernate workflow sets cluster state == kHibernateSetup.<br>The cluster agent responds to multi-cloud management facility. |

TABLE 3-continued

| Start State -> End State | Operation |
| --- | --- |
| kHiberanteSetup -> kHibernateOplog | The gateway stops all I/O. The gateway adds cloud object storage based cloud storage. |
| kHibernateOplog -> kHibernateOplogDone | The ILM drains caches (e.g., pertaining to vDisks, data path logs, etc.). |
| kHibernateData -> kHibernateDataDone | The ILM migrates all data to a cloud storage tier. |
| kHibernateMetadata__Handler -> kHibernateMetadata__HandlerDone | The gateway shuts down all cluster services that use a metadata handler. The gateway flushes the metadata handler memory tables. The gateway shuts down all services. Host agent reports to multi-cloud management facility that cluster services are down. The gateway runs routines to hibernate the metadata handler on all nodes and waits for all nodes to report completion. |
| kHibernateDone | The gateway reports "cluster_stopped". |

Cluster Resume State Machine

A resume workflows starts with the customer clicking the 'resume' button on a console. The multi-cloud management facility creates nodes and instances. Each node goes through the state machine as noted above. Each node starts by going to the 'Cluster Node State'.

In the following Table 4, all state transitions from kStateXDone to kStateX+1 are initiated by the gateway. The gateway waits for the state to move from kStateX to kStateXDone.

TABLE 4

| Start State -> End State | Operation |
| --- | --- |
| kHibernateDone -> kRestoreMetadata__Handler | The gateway starts the cluster after the metadata handler is up and does not bring up any new service that uses the metadata handler. The gateway validates that cloud tier disks are properly added. |
| kRestoreMetadata__Handler -> kRestoreMetadata__HandlerDone | The gateway executes a restore_the metadata routine on all nodes. The gateway waits for restore_the metadata routine on all nodes to be complete. |
| kRestoreData -> kRestoreDataDone | ILM performs selective resume and/or partial scan. Migrate all data from cloud storage tier to the cluster. |
| kStartCluster -> kStartClusterDone | The gateway resumes other nodes of the cluster. The gateway responds to the cluster agent with an indication of the cluster state as RUNNING. |

Node Failure During Hibernate
1. ILM keeps a copy of data in local instance store.
2. Metadata handling: Copy the management tables from the secondary copy.
3. At resume time, use a metadata repair mode.

Node Failure During Resume
1. Abandon resume if failure happens.
2. Confirm that the disk ID of the cloud storage tier remains the same so that newly added instances (i.e. to handle node failures) are created from same snapshot.

Additional System Architecture Examples

All or portions of any of the foregoing techniques can be partitioned into one or more modules and instanced within, or as, or in conjunction with a virtualized controller in a virtual computing environment. Some example instances within various virtual computing environments are shown and discussed as pertains to FIG. 8A, FIG. 8B, FIG. 8C, and FIG. 8D.

Figure 8A:
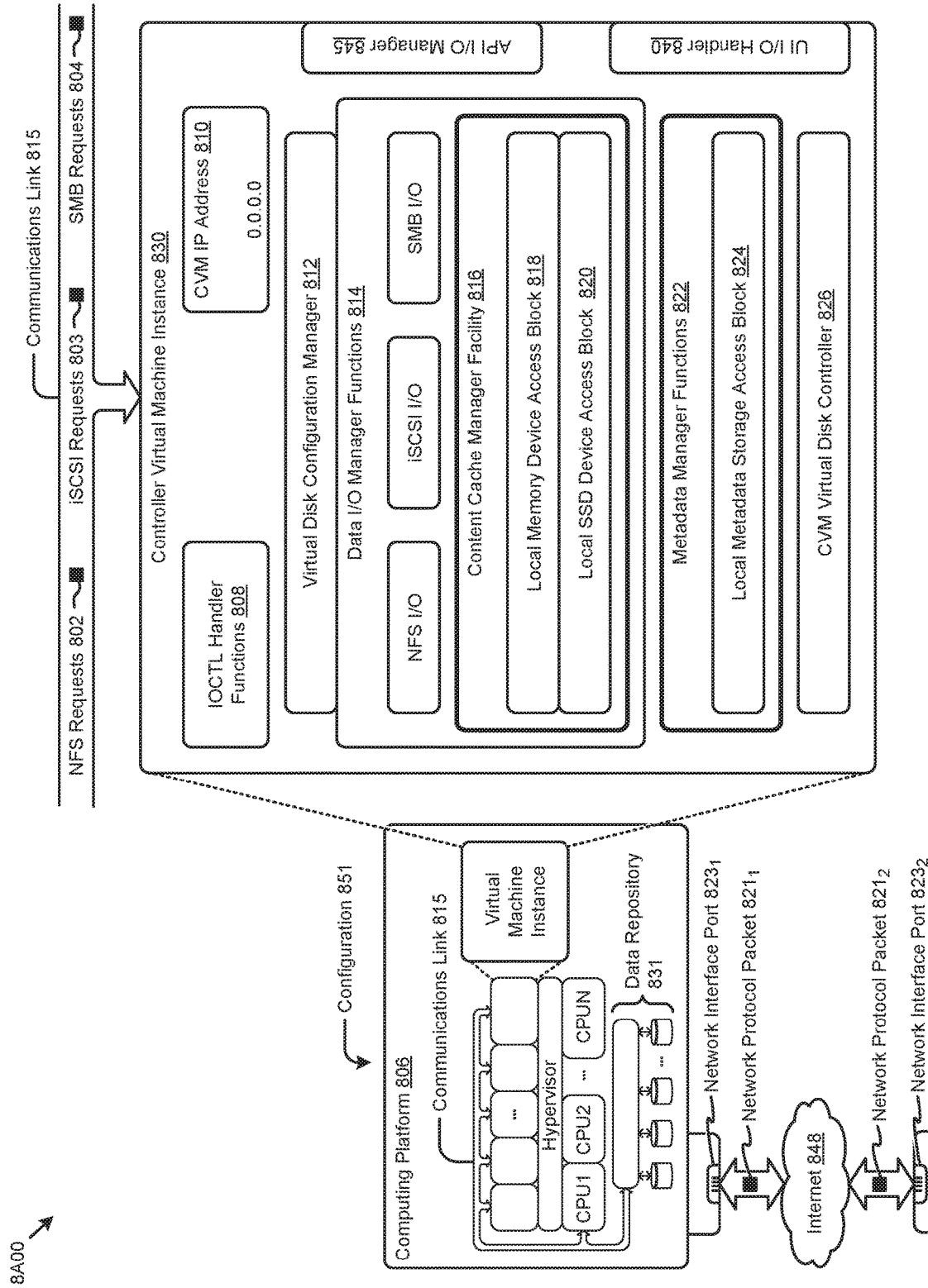
FIG. 8A, FIG. 8B, FIG. 8C, and FIG. 8D depict virtualization system architectures comprising collections of interconnected components suitable for implementing embodiments of the present disclosure and/or for use in the herein-described environments.

FIG. 8A depicts a virtualized controller as implemented in the shown virtual machine architecture 8A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to hibernating and resuming a computing cluster using facilities of an ILM. In some embodiments, a module may include one or more state machines and/or combinational logic used to implement or facilitate the operational and/or performance characteristics pertaining to hibernating and resuming a computing cluster using facilities of an ILM.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of hibernating and resuming a computing cluster using facilities of an ILM. Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to hibernating and resuming a computing cluster using facilities of an ILM, and/or for improving the way data is manipulated when performing computerized operations pertaining to using built-in capabilities of an ILM to handle the movement of data to and from a cloud-tier storage facility.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
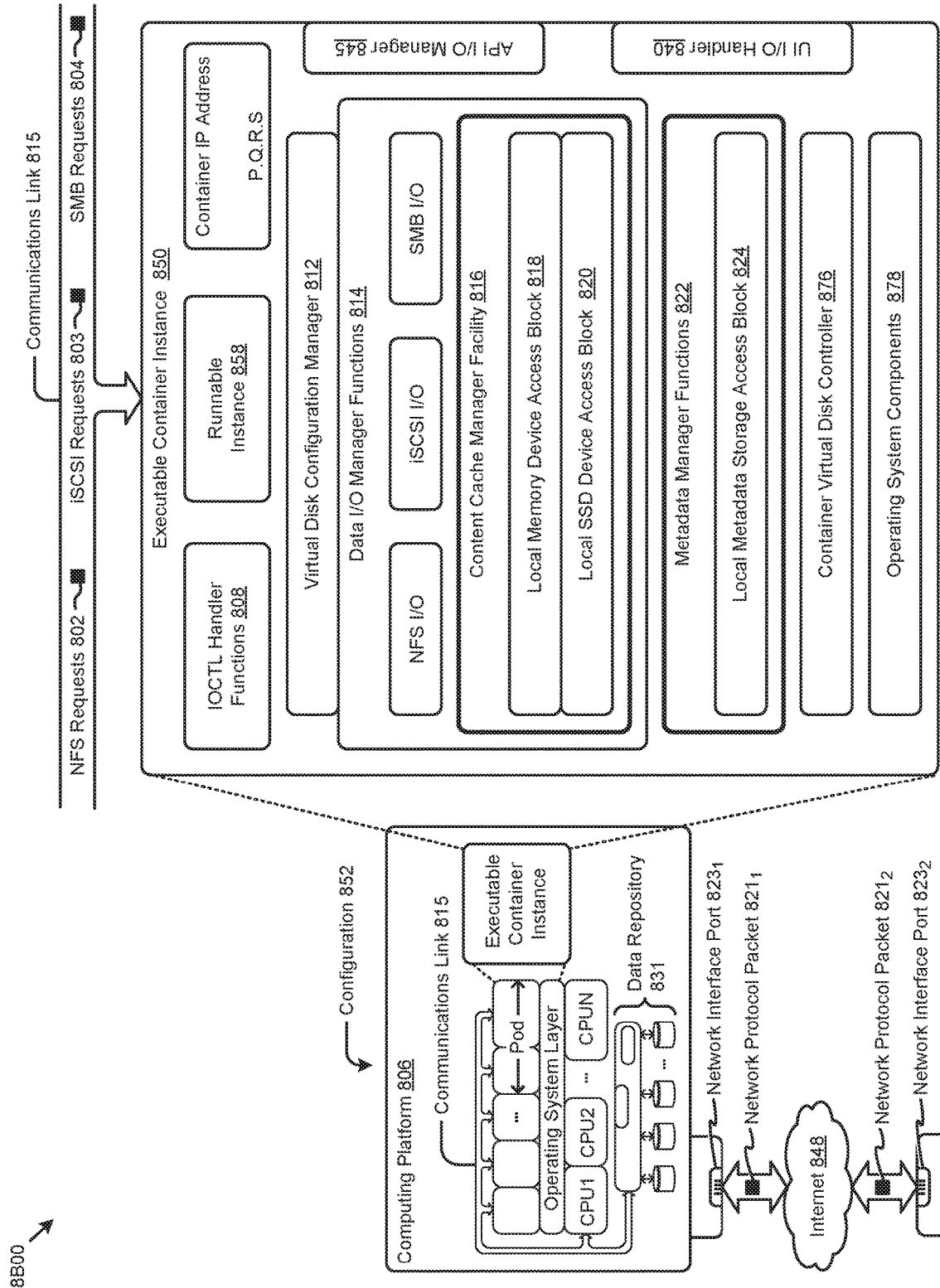

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls—a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
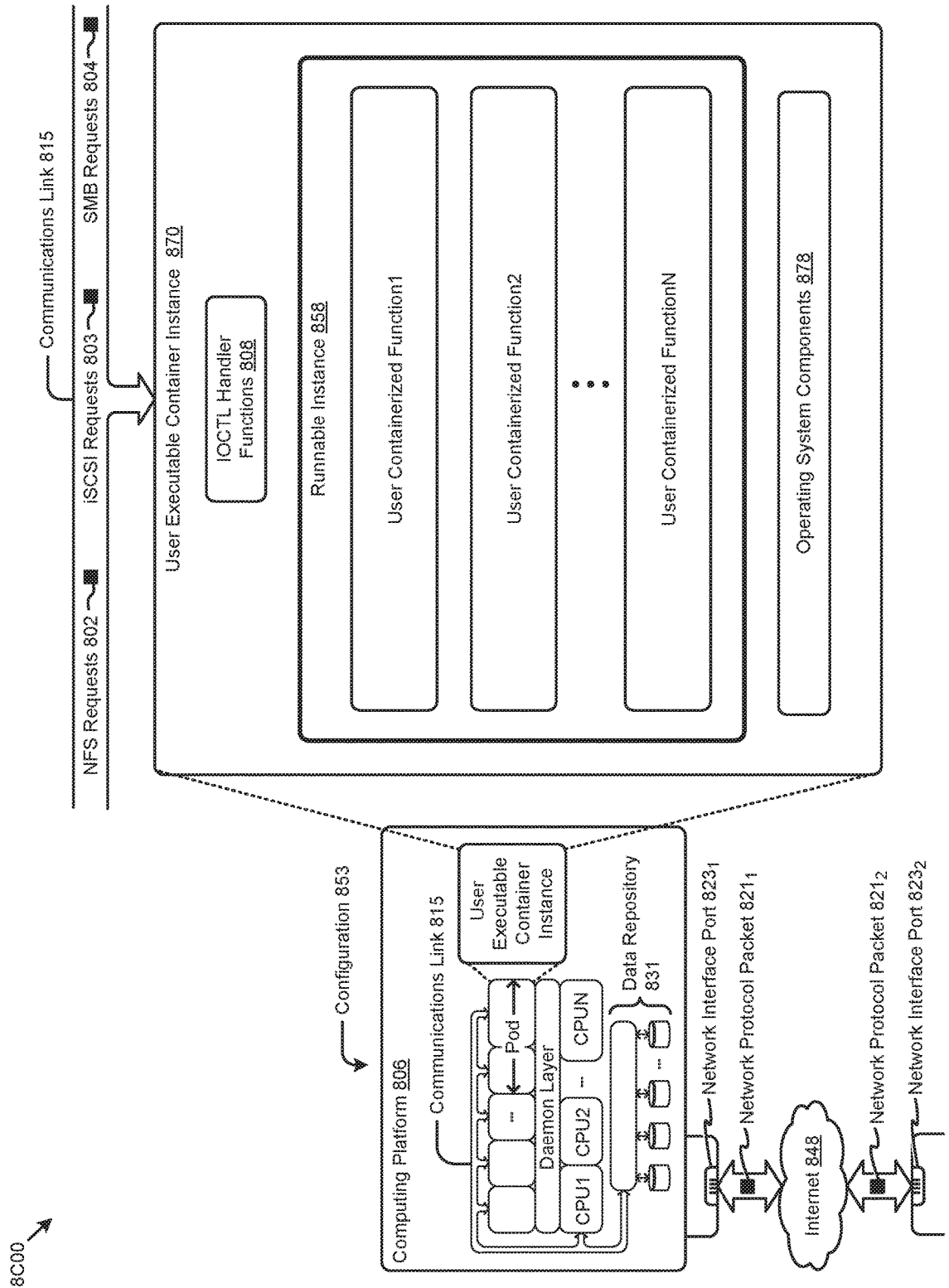

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 870.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 8D:
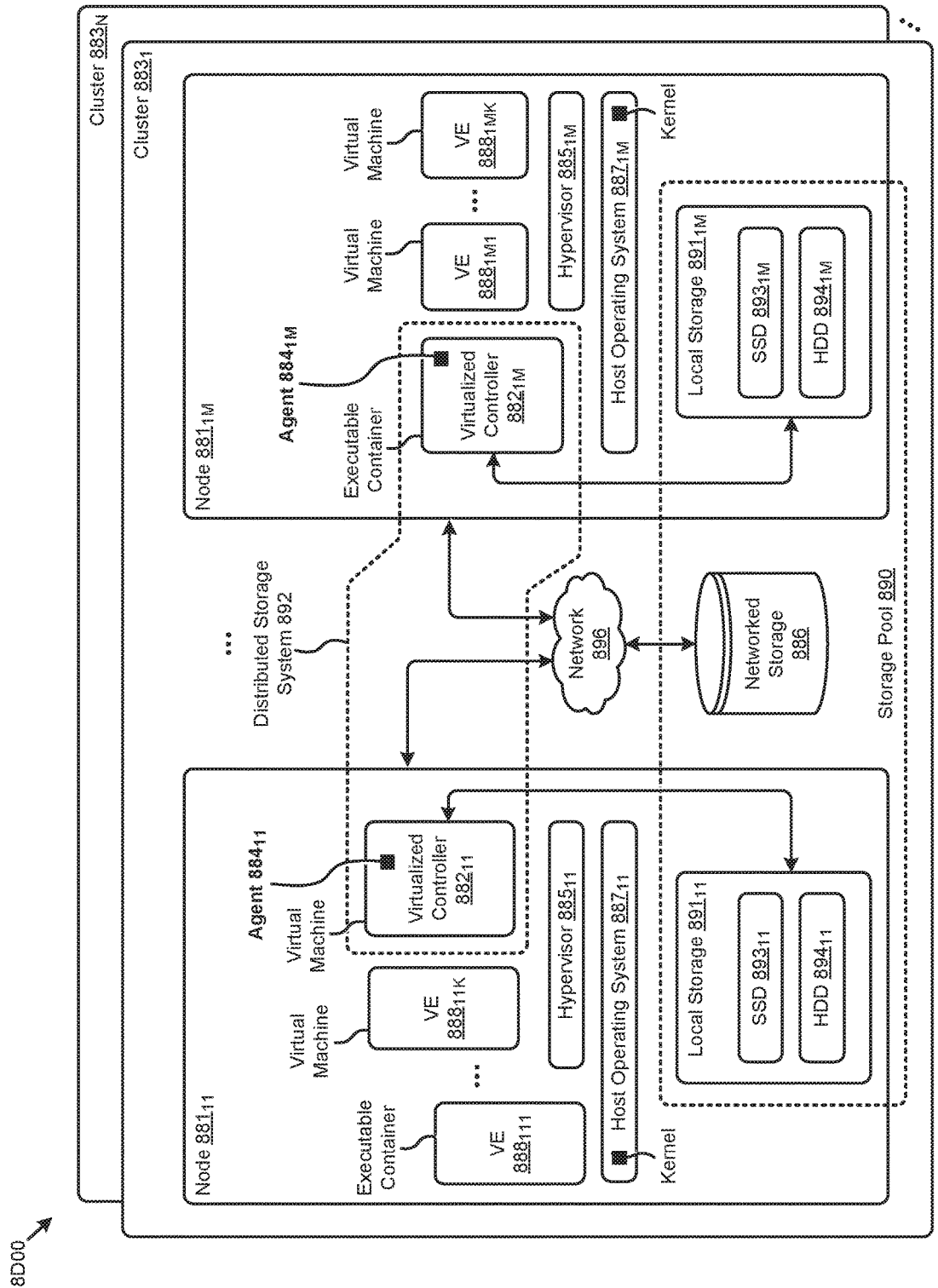

FIG. 8D depicts a distributed virtualization system in a multi-cluster environment 8D00. The shown distributed virtualization system is configured to be used to implement the herein disclosed techniques. Specifically, the distributed virtualization system of FIG. 8D comprises multiple clusters (e.g., cluster $883_1$, ..., cluster $883_N$) comprising multiple nodes that have multiple tiers of storage in a storage pool. Representative nodes (e.g., node $881_{11}$, ..., node $881_{1M}$) and storage pool 890 associated with cluster $883_1$ are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage $891_{11}$, ..., local storage $891_{1M}$). For example, the local storage can be within or directly attached to a server and/or appliance associated with the nodes. Such local storage can include solid state drives (SSD $893_{11}$, ..., SSD $893_{1M}$), hard disk drives (HDD $894_{11}$, ..., HDD $894_{1M}$), and/or other storage devices.

As shown, any of the nodes of the distributed virtualization system can implement one or more user virtualized entities (e.g., VE $888_{111}$, ..., VE $888_{11K}$, ..., VE $888_{81M1}$, ..., VE $888_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $887_{11}$, ..., host operating system $887_{1M}$), while the VMs run multiple applications on various respective guest operating systems. Such flexibility can be facilitated at least in part by a hypervisor (e.g., hypervisor $885_{11}$, ..., hypervisor $885_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $887_{11}$, ..., host operating system $887_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $881_{11}$ can interface with a controller virtual machine (e.g., virtualized controller $882_{11}$) through hypervisor $885_{11}$ to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller $882_{1M}$) in an operating system virtualization environment at a given node. In this case, for example, the virtualized entities at node $881_{1M}$ can access the storage pool 890 by interfacing with a controller container (e.g., virtualized controller $882_{1M}$) through hypervisor $885_{1M}$ and/or the kernel of host operating system $887_{1M}$.

In certain embodiments, one or more instances of an agent can be implemented in the distributed storage system 892 to facilitate the herein disclosed techniques. Specifically, agent $884_{11}$ can be implemented in the virtualized controller $882_{11}$, and agent $884_{1M}$ can be implemented in the virtualized controller $882_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to using built-in capabilities of an ILM to handle the movement of data to and from a cloud-tier storage facility can be brought to bear through implementation of any one or more of the foregoing embodiments. Moreover, any aspect or aspects of determining which data is "hot" or "cold" and when and how migration of such data should be carried out can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts for hibernating a computing cluster, the acts comprising:

receiving an instruction to hibernate a computing cluster by saving data for a hypervisor into a storage infrastructure using a service, the data pertaining to a state of a node of the computing cluster comprising multiple nodes, wherein the service, the multiple nodes, and the storage infrastructure are respectively located at a higher, an intermediate, and a lower tier in a computing environment; and invoking the service for information lifecycle management (ILM) that utilizes a datapath between the service and the storage infrastructure to move the data from the hypervisor on the node to a different location via the datapath for hibernating the computing cluster, wherein the service also uses the datapath to monitor an architectural or operational characteristic pertaining to at least the storage infrastructure for managing information lifecycle for the computing cluster.

2. The non-transitory computer readable medium of claim 1, further comprising instructions which, when stored in memory and executed by the processor cause the processor to perform further acts of invoking the service that uses the datapath connecting at least the service and the storage infrastructure through the intermediate tier to move additional data from another hypervisor of another node of the computing cluster, wherein the service interfaces with all of the multiple nodes for monitoring the architectural or operational characteristic for the information lifecycle management.

3. The non-transitory computer readable medium of claim 1, wherein, while moving the data from the hypervisor to the different location, the service performs, via the datapath connecting at least the service and the storage infrastructure through the intermediate tier, at least one of one or more parallel I/O transfers, data movement progress monitoring, or data encryption, and the storage infrastructure for the computing cluster is accessible by all of the multiple nodes in the computing cluster.

4. The non-transitory computer readable medium of claim 1, wherein, while moving the data from the hypervisor to the different location, the service performs moving the data via the datapath connecting at least the service and the storage infrastructure through the intermediate tier while a virtual machine of the hypervisor is running.

5. The non-transitory computer readable medium of claim 1, wherein the service utilizes the datapath for both a first functionality of performing the information lifecycle management and a second functionality of moving multiple pieces of data among multiple tiers in the storage infrastructure for the computing cluster in determining at least a time point for hibernating the computing cluster.

6. The non-transitory computer readable medium of claim 1, wherein the service observes a replication factor to suppress saving multiple copies of data into a hibernation object, and moving the data from the hypervisor on the node to the different location comprises saving the data into a hibernation object and storing the hibernation object to the different location.

7. The non-transitory computer readable medium of claim 1, further comprising instructions which, when stored in memory and executed by the processor cause the processor to perform further acts of:

restoring a separate node of the computing cluster by receiving an instruction to restore the hypervisor of the node of the computing cluster onto the separate node; and invoking the service to move, via at least the datapath and a separate datapath connecting the storage infrastructure in the lower tier and the separate node in the intermediate tier, the data from the different location to a separate location that is accessed by the hypervisor on the separate node.

8. The non-transitory computer readable medium of claim 7, wherein the different storage location corresponds to a first cloud computing infrastructure, and the separate storage location corresponds to a second cloud computing infrastructure.

9. A method for hibernating a computing cluster, the method comprising:
receiving an instruction to hibernate a computing cluster by saving data for a hypervisor into a storage infrastructure using a service, the data pertaining to a state of a node of the computing cluster comprising multiple nodes, wherein
the service, the multiple nodes, and the storage infrastructure are respectively located at a higher, an intermediate, and a lower tier in a computing environment; and
invoking the service for information lifecycle management (ILM) that utilizes a datapath between the service and the storage infrastructure to move the data from the hypervisor to a different location via the datapath for hibernating the computing cluster, wherein
the service also uses the datapath to monitor an architectural or operational characteristic pertaining to at least the storage infrastructure for managing information lifecycle for the computing cluster.

10. The method of claim 9, further comprising invoking the service that uses the datapath connecting at least the service and the storage infrastructure through the intermediate tier to move additional data from another hypervisor of another node of the computing cluster, wherein the service interfaces with all of the multiple nodes for monitoring the architectural or operational characteristic for the information lifecycle management.

11. The method of claim 9, wherein, while moving the data from the hypervisor to the different location, the service performs, via the datapath connecting at least the service and the storage infrastructure through the intermediate tier, at least one of one or more parallel I/O transfers, data movement progress monitoring, or data encryption.

12. The method of claim 9, wherein, while moving the data from the hypervisor to the different location, the service moves the data via the datapath connecting at least the service and the storage infrastructure through the intermediate tier while a virtual machine of the hypervisor is running.

13. The method of claim 9, wherein the service utilizes the datapath for both a first functionality of performing the information lifecycle management and a second functionality of moving multiple pieces of data among multiple tiers in the storage infrastructure for the computing cluster in determining at least a time point for hibernating the computing cluster.

14. The method of claim 9, wherein the service observes a replication factor to suppress saving multiple copies of data into a hibernation object, and moving the data from the hypervisor on the node to the different location comprises saving the data into a hibernation object and storing the hibernation object to the different location.

15. The method of claim 9, further comprising:
restoring a separate node of the computing cluster by receiving an instruction to restore the hypervisor of the node of the computing cluster onto the separate node; and
invoking the service to move, via at least the datapath and a separate datapath connecting the storage infrastructure in the lower tier and the separate node in the intermediate tier, the data from the different location to a separate location that is accessed by the hypervisor on the separate node.

16. The method of claim 15, wherein the different location corresponds to a first cloud computing infrastructure, and the separate location corresponds to a second cloud computing infrastructure.

17. A system for hibernating a computing cluster, the system comprising:
a non-transitory storage medium having stored thereon a sequence of instructions; and
a processor that executes the sequence of instructions to cause the processor to perform acts comprising,
receiving an instruction to hibernate a computing cluster by saving data for a hypervisor into a storage infrastructure using a service, the data pertaining to a state of a node of the computing cluster comprising multiple nodes, wherein
the service, the multiple nodes, and the storage infrastructure are respectively located at a higher, an intermediate, and a lower tier in a computing environment; and
invoking the service for information lifecycle management (ILM) that utilizes a datapath between the service and the storage infrastructure to move the data from the hypervisor to a different location via the datapath for hibernating the computing cluster, wherein
the service also uses the datapath to monitor an architectural or operational characteristic pertaining to at least the storage infrastructure for managing information lifecycle of the computing cluster.

18. The system of claim 17, further comprising instructions which, when stored in memory and executed by the processor cause the processor to perform further acts of invoking the service that uses the datapath connecting at least the service and the storage infrastructure through the intermediate tier to move additional data from another hypervisor of another node of the computing cluster, wherein the service interfaces with all of the multiple nodes for monitoring the architectural or operational characteristic for the information lifecycle management.

19. The system of claim 17, wherein, while moving the data from the hypervisor to the different location, the service performs via the datapath connecting at least the service and the storage infrastructure through the intermediate tier at least one of one or more parallel I/O transfers, data movement progress monitoring, or data encryption.

20. The system of claim 17, wherein, while moving the data from the hypervisor to the different location, the service moves the data via the datapath connecting at least the service and the storage infrastructure while a virtual machine of the hypervisor is running.

21. The system of claim 17, wherein the service utilizes the datapath for both a first functionality of performing the information life cycle management and a second functionality of moving multiple pieces of data among multiple tiers of the computing cluster in determining at least a time point for execution of the instruction to hibernate the computing cluster.

22. The system of claim 17, wherein the service observes a replication factor to suppress saving multiple copies of data into a hibernation object, and moving the data from the hypervisor on the node to the different location comprises saving the data into a hibernation object and storing the hibernation object to the different location.

23. The system of claim 17, further comprising instructions which, when stored in memory and executed by the processor cause the processor to perform further acts of:
restoring a separate node of the computing cluster by receiving an instruction to restore the hypervisor of the node of the computing cluster; and
invoking the service to move, via at least the datapath and a separate datapath connecting the storage infrastructure in the lower tier and the separate node in the intermediate tier, the data from the different location to a separate location that is accessed by the hypervisor on the separate node.

24. The system of claim 23, wherein the different location corresponds to a first cloud computing infrastructure, and the separate storage location corresponds to a second cloud computing infrastructure.

25. The non-transitory computer readable medium of claim 1, wherein the computing cluster is hibernated by persisting cluster configuration and user data pertaining to the multiple nodes of the computing cluster, the service is hosted in the higher tier above the intermediate tier in which the multiple nodes are located, the storage infrastructure is located in the lower tier below the intermediate tier, and the multiple nodes comprise a higher tier storage that form a tiered storage with the storage infrastructure in the lower tier for the computing cluster.

26. The method of claim 9, wherein the computing cluster is hibernated by persisting cluster configuration and user data pertaining to the multiple nodes of the computing cluster, the service is hosted in the higher tier above the intermediate tier in which the multiple nodes are located, the storage infrastructure is located in the lower tier below the intermediate tier, and the multiple nodes comprise a higher tier storage that form a tiered storage with the storage infrastructure in the lower tier for the computing cluster.

27. The system of claim 17, wherein the computing cluster is hibernated by persisting cluster configuration and user data pertaining to the multiple nodes of the computing cluster, the service is hosted in the higher tier above the intermediate tier in which the multiple nodes are located, the storage infrastructure is located in the lower tier below the intermediate tier, and the multiple nodes comprise a higher tier storage that form a tiered storage with the storage infrastructure in the lower tier for the computing cluster.

* * * * *